(12) United States Patent
Frank et al.

(10) Patent No.: US 8,883,942 B2
(45) Date of Patent: *Nov. 11, 2014

(54) TERMINALLY UNSATURATED, OXETANE-BASED MACROMONOMERS, AND METHODS FOR THE PRODUCTION THEREOF

(75) Inventors: Albert Frank, Xanten (DE); Wojciech Jaunky, Wesel (DE); Jörg Issberner, Willich (DE)

(73) Assignee: BYK-Chemie GmbH (DE)

( * ) Notice: Subject to any disclaimer, the term of this patent is extended or adjusted under 35 U.S.C. 154(b) by 379 days.

This patent is subject to a terminal disclaimer.

(21) Appl. No.: 13/321,345

(22) PCT Filed: May 3, 2010

(86) PCT No.: PCT/EP2010/002672
§ 371 (c)(1),
(2), (4) Date: Feb. 6, 2012

(87) PCT Pub. No.: WO2010/133289
PCT Pub. Date: Nov. 25, 2010

(65) Prior Publication Data
US 2012/0142888 A1    Jun. 7, 2012

(30) Foreign Application Priority Data
May 19, 2009    (DE) .......................... 10 2009 021 913

(51) Int. Cl.
| | | |
|---|---|---|
| C08L 29/10 | (2006.01) | |
| C09D 133/08 | (2006.01) | |
| C08G 65/18 | (2006.01) | |
| C08L 29/00 | (2006.01) | |
| C09D 133/00 | (2006.01) | |

(52) U.S. Cl.
CPC ..................................... C08G 65/18 (2013.01)
USPC ............. 526/75; 526/279; 526/320; 524/558; 524/544; 528/417; 528/408

(58) Field of Classification Search
CPC .................................................... C08G 65/18
USPC .................... 526/75, 279, 320; 524/544, 558; 528/417, 408
See application file for complete search history.

(56) References Cited

U.S. PATENT DOCUMENTS

| | | | |
|---|---|---|---|
| 6,111,054 A | 8/2000 | Haubennestel et al. | |
| 6,291,620 B1 | 9/2001 | Moad et al. | |
| 7,034,085 B2 | 4/2006 | Mestach et al. | |
| 8,501,880 B2 * | 8/2013 | Jaunky et al. .................. | 526/75 |
| 2010/0240842 A1 | 9/2010 | Frank et al. | |
| 2011/0294933 A1 | 12/2011 | Jaunky et al. | |
| 2012/0130007 A1 | 5/2012 | Jaunky et al. | |

FOREIGN PATENT DOCUMENTS

| | | |
|---|---|---|
| CA | 2352660 A1 | 2/2002 |
| DE | 10039837 A1 | 3/2002 |
| EP | 270126 A2 | 6/1988 |
| NO | WO-00/56802 A1 | 9/2000 |
| WO | WO-98/01478 A1 | 1/1998 |
| WO | WO-98/58974 A1 | 12/1998 |
| WO | WO-99/31144 A1 | 6/1999 |
| WO | WO-01/00701 A1 | 1/2001 |
| WO | WO-02/22700 A2 | 3/2002 |
| WO | WO-02/40572 A1 | 5/2002 |
| WO | WO-03/062306 A1 | 7/2003 |

OTHER PUBLICATIONS

U.S. Appl. No. 13/321,357, Notice of Allowance mailed Apr. 8, 2013, 8 pgs.
U.S. Appl. No. 13/321,357, Notice of Allowance mailed Dec. 10, 2012, 10 pgs.
U.S. Appl. No. 13/321,357, Preliminary Amendment filed Nov. 18, 2011, 7 pgs.
International Application No. PCT/EP2010/002671, International Preliminary Report on Patentability mailed Nov. 24, 2011, (English Translation), 6 pgs.
International Application No. PCT/EP2010/002671, International Report on Patentability mailed Jun. 11, 2011, 6 pgs.
International Application No. PCT/EP2010/002671, International Search Report and Written Opinion mailed Dec. 14, 2010, 13 pgs.
International Application No. PCT/EP2010/002672, International Preliminary Report on Patentability mailed Nov. 24, 2011, (English Translation), 5 pgs.
International Application No. PCT/EP2010/002672, International Report on Patentability mailed Jun. 1, 2011, 6 pgs.
International Application No. PCT/EP2010/002672, International Search Report and Written Opinion mailed Dec. 3, 2010, 13 pgs.
Bednarek, M., et al., "Branched polyether with multiple primary hydroxyl groups: polymerization of 3-ethyl-3-hydroxymethyloxetane", *Macromolecular: Rapid Communications*, 20(7), (Jul. 1, 1999), 369-372.
Braun, Dietrich, "Initiation of free radical polymerization by thermal cleavage of carbon-carbon bonds", *Macromol. Symp.*, 111(1), (1996), 63-71.
Carlmark, A., et al., "Atom transfer radical polymerization of methyl acrylate from a multifunctional initiator at ambient temperature", *Polymer* 43, (2002), 4237-4242
Goto, A., et al., "Living Radical Polymerization with Nitrogen Catalyst: Reversible Chain Transfer Catalyzed Polymerization with N-Iodosuccinirnide", *Macromolecules*, 41(17), (2008), 6261-6264.
Gridnev, A., et al., "Catalytic Chain Transfer in Free-Radical Polymerizations", *Chem. Rev.*, 101(12), (2001), 3611-3660.
Gridnev, A., "The 25th Anniversary of Catalytic Chain Transfer", *Journal of Polymer Science, Part A: Polymer Chemistry*, 38(10), (May 2000), 1753-1766.

(Continued)

*Primary Examiner* — Duc Truong
(74) *Attorney, Agent, or Firm* — Schwegman Lundberg & Woessner, P.A.

(57) ABSTRACT

A process for preparing a macromonomer by cationic ring-opening polymerization of at least one hydroxyoxetane with a terminally ethylenically unsaturated starter molecule free of allyl groups in a molar ratio (hydroxyoxetane(s):starter molecule) of (100:1) to (1:1) in the presence of at least one suitable catalyst; macromononomers obtainable therefrom and use thereof.

12 Claims, No Drawings

(56) References Cited

OTHER PUBLICATIONS

Harada, T., et al., "Preparation of macromonomers by copolymerization of methyl acrylate dimer involving β fragmentation", *Journal of Polymer Science, Part A: Polymer Chemistry*, 42(3), (Feb. 2004), 597-607.

Hawker, C. J., et al., "New Polymer Synthesis by Nitroxide Mediated Living Radical Polymerizations", *Chemical Reviews*, 101(12), (2001), 3661-3688.

Junkers, Thomas, et al., "Thioketone-Mediated Polymerization of Butyl Acrylate: Controlling Free-Radical Polymerization via a Dormant Radical Species", *Macromolecular Rapid Communications*, 28(6), (Mar. 16, 2007), 746-753.

Kobatake, S,, et al., "Radical polymerization and copolymerization of methyl-(2-carbomethoxyethyl)acrylate, a dimer of methyl acrylate, as a polymerizable-substituted acrylate", *Journal of Polymer Science, Part A: Polymer Chemistry*, 34(1), (Jan. 1996), 95-108.

Mark, H. F, et al., "Adsorption", *Encyclopedia of Polymer Science arid Engineering*, vol. 7, (1987), 580.

Moad, G., et al., "Living free radical polymerization with reversible addition-fragmentation chain transfer (the life of RAFT)", *Polymer International*, 49, (2000), 993-1001.

Moad, G., et al., "Living Radical Polymerization by the RAFT Process", *Aust. J. Chem.*, 58, (2005), 379-410.

Otsu, T., et al., "Role of Initiator-Transfer Agent-Terminator (Iniferter) in Radical Polymerizations", *Die Makromolekulare Chemie, Rapid Communications*, 3(2), (1982), 127-132.

Perrier, S., et al., "Macromolecular Design via Reversible Addition-Fragmentation Chain Transfer (RAFT)/Xanthates (MADIX) Polymerization", *Journal of Polymer Science: Part A: Polymer Chemistry*, vol. 43, (2005), 5347-5393.

Sato, E., et al., "Macromonomer synthesis using -(2-methyl-2-phenylpropyl)acrylates as addition-fragmentation chain-transfer agents expelling the cumyl radical", *Journal of Polymer Science, Part A: Polymer Chemistry*, 42(23), (Dec. 2004), 6021-6030.

Tanaka, H., et al., "Polymerization reactivity of unsaturated end group generated during the disproportionation in termination reaction of methyl methacrylate polymerization: A study using model compounds", *Journal of Polymer Science Part A: Polymer Chemistry*, 27(5), (Apr. 1989), 1741-1748.

Toy, A. A., et al., "Thioketone spin traps as mediating agents for free radical polymerization processes", *Chem. Commun.*, 8, (2006), 835-837.

Trumbo, D. L, et al., "The copolymerization behavior of acrylate dimers: Copolymers of methyl, ethyl, and n-butyl acrylate dimers", *Journal of Polymer Science, Part A: Polymer Chemistry*, 29(7), (Jun. 1991), 1053-1059.

Watanabe, Y., et al., "Addition-Fragmentation Chain Transfer in Free Radical Styrene Polymerization in the Presence of 2,4-Diphenyl-4-methyl-1-pentene", *Chemistry Letters*, 22(7), (1993), 1089-1092.

Wayland, B. B., et al., "Degenerative Transfer and Reversible Termination Mechanisms for Living Radical Polymerizations Mediated by Cobalt Porphyrins", *Macromolecules*, 39, (2006), 8219-8222.

Webster, O. W., "Group Transfer Polymerization: A Critical Review of Its Mechanism and Comparison with Other Methods for Controlled Polymerization of Acrylic Monomers", *Advances in Polymer Science*, vol. 167, *New Synthetic Methods*, (2004), 257-266.

Wieland, P. C., et al., "A New Additive for Controlled Radical Polymerization", *Macromolecular Rapid Communications*, 22(9), (2001), 700-703.

Yamada, B., et al., "Introduction of 2-methoxycarbonylallyl end group by copolymerization of methyl-(phenoxymethyl)acrylate accompanying with addition-fragmentation reaction", *Journal of Polymer Science, Part A: Polymer Chemistry*, 31(6), (May 1993), 1551-1559.

Yamada, B., et al., "Preparation of polymers with substituted allyl end group using dimer of -methylvinyl monomer as addition fragmentation chain transfer agent at high temperatures", *Journal of Polymer Science, Part A: Polymer Chemistry*, 32(14), (Nov. 1994), 2745-2754.

Yamada, B., et al., "Substituted propenyl end groups as reactive intermediates in radical polymerization", *Journal of Polymer Chemistry, Part A: Polymer Chemistry*, 41(5), (Mar. 2003), 645-654.

Zetterlund, P. B, et al., "Addition-Fragmentation Chain Transfer Involving Dimers of alpha-Methylvinyl Monomers Studied by ESR Spectroscopy: Competition between Fragmentation and Bimolecular Termination", *Macromolecular Rapid Communications*, 24(2), (Feb. 2003), 197-201.

\* cited by examiner

TERMINALLY UNSATURATED, OXETANE-BASED MACROMONOMERS, AND METHODS FOR THE PRODUCTION THEREOF

PRIORITY CLAIM TO RELATED APPLICATIONS

This application is a national stage application under 35 U.S.C. §371 of PCT/EP2010/002672, filed May 3, 2010, and published as WO 2010/133289 A3 on Nov. 25, 2010, which claims priority to German Application No. 10 2009 021 913.7, filed May 19, 2009, which applications and publication are incorporated by reference as if reproduced herein and made a part hereof in their entirety, and the benefit of priority of each of which is claimed herein.

The invention relates to terminally unsaturated, oxetane-based macromonomers and to a process for preparation thereof.

STATE OF THE ART

Macromonomers are oligomers or polymers with at least one functional end group through which polymerization reactions can proceed. Macromonomers are thus macromolecular monomers which can be converted to homo- or copolymers of defined structures. For example, macromonomers can be reacted with an ethylenically unsaturated end group by free-radical polymerization to give graft copolymers or comb polymers with a defined length of the side chains.

WO 02/40572 A1 describes a process for preparing dendritic polyethers with a core which originates from a compound having two or more hydroxyl groups, and at least one branching generation obtainable from at least one hydroxyoxetane. The core of the dendritic polyether may contain one or more allyl groups. Allyl groups, however, have only comparatively low reactivity in free-radical polymerization reactions.

WO 00/56802 A1 describes the synthesis of hyperbranched dendritic polyethers obtainable by thermally initiated catalytic ring-opening of oxetane monomers having at least two functional groups. The terminal hydroxyl groups of the hyperbranched dendritic polyethers obtained can then be converted further, for example by functionalization with epoxide, allyl or acrylate groups. However, it is not possible by this method to obtain defined polyethers each containing only one free-radically polymerizable group per molecule.

The free-radical polymerization of those macromonomers which contain a plurality of free-radically polymerizable groups per molecule involves the risk of unwanted crosslinking reactions.

PROBLEM

The problem addressed by the present invention was that of providing novel oxetane-based macromonomers and a process for preparation thereof, each of which contain one readily free-radically polymerizable head group per molecule, and from which novel homo- and/or copolymers are obtainable by free-radical homo- or copolymerization, optionally with further comonomers, said novel homo- and/or copolymers being usable as additives in coating compositions and/or plastics.

Through the use of the novel homo- and/or copolymers as additives, it shall be possible to alter the properties of the coating compositions or coatings and/or plastics in a controlled manner.

For example, it shall be possible to obtain additives which are suitable as flow control agents and can improve, for example, the leveling, gloss and/or opalescence of the coating compositions or coatings or plastics.

For example, it shall be possible to obtain additives which impart a non-stick surface to the coating compositions or coatings and/or the plastics, such that, for example, dirt-, water- and/or oil-repellent surfaces can be achieved.

For example, it shall be possible to obtain additives which are suitable as wetting agents and dispersants and, for example, can lower the viscosity of pigmented and/or filler-containing coating compositions and/or stabilize the dispersion of pigments and/or fillers in coating compositions.

For example, it shall be possible to obtain additives which impart improved wettability to the coating compositions or coatings and/or the plastics, such that, for example, more easily printable surfaces are achieved and/or the adhesion of coatings is improved. Many coatings, polymeric molding compositions and thermoplastics have a nonpolar surface with low surface energy. It is therefore a challenge to wet such surfaces, for example by means of aqueous coating compositions, printing inks, aqueous polymer dispersions, adhesives or adhesion promoters. In order to improve the wettability of such substrate surfaces by means of polar (for example aqueous) coating compositions, the surface energy of the substrates must be increased by the use of additives, such that the substrate surfaces are rendered more polar. For this reason, there is a need to develop corresponding additives for improving wettability and hence, for example, the printability or paintability of various coatings, polymeric molding compositions and thermoplastics.

Furthermore, the additives added to impart these improved properties shall as far as possible not impair the other properties of the coating compositions or coatings, polymeric molding compositions or thermoplastics. The additives added shall also be able to display their efficacy in relatively small amounts. The coatings, polymeric molding compositions and thermoplastics shall also virtually maintain their improved surface properties over a long period of several years, even under outdoor weathering. This should also include the permanence of the effects, for example of the non-stick and/or dirt-repellent effect, over several cleaning cycles.

SOLUTION

These problems are surprisingly solved by the subject matter of the independent claims. Particular embodiments of the invention are described in the dependent claims.

The invention provides a process for preparing a macromonomer, wherein at least one hydroxyoxetane of the formula (I)

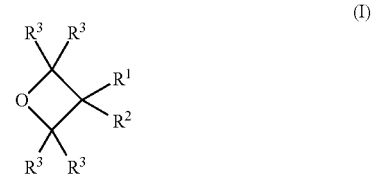

in which $R^1$ is alkyl, alkoxy, alkoxyalkyl, aryloxyalkyl, hydroxyalkyl, hydroxyalkoxy, hydroxyalkoxyalkyl, aryl, aryloxy, hydroxyaryl or hydroxyaryloxy, $R^2$ is hydroxyalkyl, hydroxyalkoxy, hydroxyalkoxyalkyl, hydroxyaryl or hydroxyaryloxy, and $R^3$ is in each case independently hydrogen, alkyl, alkoxy, alkoxyalkyl, aryloxyalkyl, hydroxyalkyl, hydroxyalkoxy, hydroxyalkoxyalkyl, aryl, aryloxy, hydroxyaryl or hydroxyaryloxy, is reacted with a starter molecule U-L-X—H in which U=an ethylenically unsaturated, free-radically polymerizable head group other than allyl [$H_2CH=CH—CH_2$—], L=divalent organic radical without free-radically polymerizable groups, and X—H=group which cannot be polymerized free-radically and has an active hydrogen atom H, in a molar ratio (hydroxyoxetane(s) of the formula (I): starter molecule) of (100:1) to (1:1) in the presence of at least one suitable catalyst in a cationic ring-opening polymerization.

The invention further provides macromonomers obtainable by this process.

DETAILED DESCRIPTION OF THE INVENTION

It is essential to the invention that the inventive oxetane-based macromonomers obtainable by the process according to the invention each contain one free-radically polymerizable head group per molecule. This makes it possible to obtain polymers with defined comb structure in a subsequent free-radical homo- or copolymerization. It is additionally essential to the invention that the head group is readily free-radically polymerizable. Therefore, allyl groups [$H_2C=CH—CH_2$—], which only have a slight tendency to free-radical polymerization, are not suitable as head groups.

Hydroxyoxetanes

In the process according to the invention, at least one hydroxyoxetane of the formula (I)

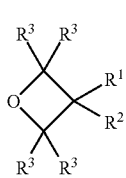

(I)

in which $R^1$ is alkyl, alkoxy, alkoxyalkyl, aryloxyalkyl, hydroxyalkyl, hydroxyalkoxy, hydroxyalkoxyalkyl, aryl, aryloxy, hydroxyaryl or hydroxyaryloxy, $R^2$ is hydroxyalkyl, hydroxyalkoxy, hydroxyalkoxyalkyl, hydroxyaryl or hydroxyaryloxy, and $R^3$ is in each case independently hydrogen, alkyl, alkoxy, alkoxyalkyl, aryloxyalkyl, hydroxyalkyl, hydroxyalkoxy, hydroxyalkoxyalkyl, aryl, aryloxy, hydroxyaryl or hydroxyaryloxy, is reacted with a starter molecule as described above.

Preferably, the at least one hydroxyoxetane of the formula (I) is a 3-alkyl-3-(hydroxyalkyl)oxetane [i.e. $R^1$=alkyl, $R^2$=hydroxyalkyl, all $R^3$=H], a 3,3-di(hydroxyalkyl)oxetane [i.e. $R^1$, $R^2$=hydroxyalkyl, all $R^3$=H], a 3-alkyl-3-(hydroxyalkoxy)oxetane [i.e. $R^1$=alkyl, $R^2$=hydroxyalkoxy, all $R^3$=H], a 3-alkyl-3-(hydroxyalkoxyalkyl)oxetane [i.e. $R^1$=alkyl, $R^2$=hydroxyalkoxyalkyl, all $R^3$=H], or a mixture of these hydroxyoxetanes, more preferably a 3-alkyl-3-(hydroxyalkyl)oxetane [i.e. $R^1$=alkyl, $R^2$=hydroxyalkyl, all $R^3$=H] and/or a 3-alkyl-3-(hydroxyalkoxy)oxetane [i.e. $R^1$=alkyl, $R^2$=hydroxyalkoxy, all $R^3$=H].

The expression "alkyl" here preferably represents linear or branched alkyl radicals having 1 to 24 carbon atoms, for example having 1 to 12 or having 1 to 8 carbon atoms. More preferably, the expression "alkyl" represents methyl or ethyl.

The expression "alkoxy" here preferably represents methoxy, ethoxy, propoxy, butoxy, phenylethoxy, more preferably ethoxy and/or propoxy, and comprises up to alkoxy units or a combination of two or more alkoxy units which may be arranged randomly, in blocks or in the manner of a gradient.

Examples of particularly suitable hydroxyoxetanes are 3-methyl-3-(hydroxymethyl)oxetane [i.e. $R^1$=methyl, $R^2$=hydroxymethyl, all $R^3$=H], 3-ethyl-3-(hydroxymethyl)oxetane [i.e. $R^1$=ethyl, $R^2$=hydroxymethyl, all $R^3$=H](=trimethylolpropane oxetane), and the derivatives thereof which have been ethoxylated and/or propoxylated on the hydroxyl group and have 1-20 ethylene oxide and/or propylene oxide units which may be arranged randomly, in blocks or in the manner of a gradient, 3,3-di(hydroxymethyl)oxetane [i.e. $R^1$=$R^2$=hydroxymethyl, all $R^3$=H], or a mixture of these hydroxyoxetanes.

Particular preference is given to using 3-ethyl-3-(hydroxymethyl)oxetane (=trimethylolpropane oxetane, TMPO) and/or the derivatives thereof which have been ethoxylated and/or propoxylated on the hydroxyl group and have 1-20 ethylene oxide and/or propylene oxide units which may be arranged randomly, in blocks or in the manner of a gradient.

One advantage of the macromonomers prepared on the basis of ethoxylated TMPO as compared with linear polyethylene glycol methacrylates is that they, given the same molar mass, have a lower melting point (lower crystallinity) and lower viscosity. These properties are also found in the polymers prepared from these macromonomers.

The hydroxyl group(s) of the hydroxyoxetane may be present in free form or protected by suitable protecting groups. Protecting groups are understood to mean readily cleavable groups, for example acetals.

The hydroxyl group(s) of the hydroxyoxetane can also be used for derivatizations. For example, the hydroxyl groups of the hydroxyoxetane can be alkoxylated with ethylene oxide, propylene oxide, butylene oxide or styrene oxide. It is also possible to use mixtures of the alkylene oxides. The hydroxyoxetanes are preferably ethoxylated and/or propoxylated prior to the ring-opening polymerization. In addition, it is possible, for example, to introduce further side chains by the reaction of the hydroxyl groups with isocyanates to form urethanes. For example, it is possible to introduce polyethylene oxide (EO), polypropylene oxide (PO) or mixed EO-PO side chains (EO/PO herein as a random polymer, block polymer or gradient polymer) as grafted side chains by reacting the corresponding TDI (tolylene diisocyanate) monoadducts of the polyalkylene oxide(s) with the hydroxyl groups of the hydroxyoxetane. Further possible derivatizations of the hydroxyl groups of the hydroxyoxetane are, for example, Williamson ether synthesis, reactions with acidic anhydrides or carboxymethylation. All known derivatizations are possible in principle, provided that they do not have any adverse effect on the later cationic ring-opening polymerization of the hydroxyoxetanes or on the free-radical polymerization of the unsaturated head groups of the oxetane-based macromonomers which form in the case of use thereof. A derivatization of the hydroxyoxetanes can influence the properties of the inventive oxetane-based macromonomers, such that, in the case of use of the inventive macromonomers to prepare polymers, it is also possible to influence the properties of the polymers, for example with regard to compatibility with different coating compositions and plastics.

Starter Molecules U-L-X—H

The starter molecule U-L-X—H contains an ethylenically unsaturated, free-radically polymerizable head group U other than allyl [H$_2$C=CH—CH$_2$—]. It is essential to the invention that one head group is readily free-radically polymerizable. Therefore, allyl groups [H$_2$C=CH—CH$_2$—], which have only a low tendency to free-radical polymerization, are not suitable as head groups. Preferably, the ethylenically unsaturated head group is U=acryloyl [H$_2$C=CH—C(=O)—] or methacryloyl [H$_2$C=C(CH$_3$)—C(=O)—].

The divalent organic L radical does not contain any free-radically polymerizable groups. Free-radically polymerizable groups are understood to mean functional groups which can be free-radically polymerized under conditions customary therefor, for example ethylenically unsaturated groups. The L radical may, for example, be an alkylene, arylene or polyalkylene oxide radical.

Preferably, the divalent organic L radical has the structure —O-L' where —O— is an oxygen atom and L' is selected from the group consisting of alkylene radicals and polyalkylene oxide radicals.

More preferably, the divalent organic L radical has the structure —O-L' where —O— is an oxygen atom and L' is selected from the group consisting of alkylene radicals having 2-5 carbon atoms, polyethylene oxide radicals having 2-5 ethylene oxide units, polypropylene oxide radicals having 2-5 propylene oxide units and mixed polyethylene/polypropylene radicals having 2-5 alkylene oxide units.

Most preferably, the divalent organic L radical has the structure —O-L where —O— is an oxygen atom and L' is an alkylene radical having 2-5 carbon atoms.

The X—H group is a functional group which cannot be polymerized free-radically and has an active hydrogen atom H. An active hydrogen atom is understood to mean a hydrogen atom which can initiate the cationic ring-opening polymerization of oxetanes under acidic catalysis, for example with a Lewis acid (e.g. AlCl$_3$, BF$_3$, TiCl$_4$, ZnI$_2$, SiF$_4$, SbF$_5$, PF$_5$, AsF$_5$ or SbCl$_5$) or, for example, with a halogenated acid (e.g. FSO$_3$H, ClSO$_3$H, HClO$_4$, HIO$_4$ or CF$_3$SO$_3$H), or another Brønsted acid (e.g. paratoluenesulfonic acid, sulfonic acid) at 30° C. to 130° C. The X—H group may, for example, be an N—H group, an S—H group or an O—H group. The X—H group is preferably a hydroxyl group O—H or a thiol group S—H, since higher yields can generally be achieved as a result. The X—H group is more preferably a hydroxyl group O—H.

The starter molecule U-L-X—H is preferably selected from the group consisting of hydroxyalkyl esters of methacrylic acid [H$_2$C=C(CH$_3$)—C(=O)—O—(CH$_2$)$_a$—OH] and polyethylene oxide esters of methacrylic acid [H$_2$C=C(CH$_3$)—C(=O)—O—(CH$_2$—CH$_2$—O)$_a$—H] where a=1-20, preferably a=1-10 and more preferably a=2-5.

The starter molecule U-L-X—H is most preferably hydroxyethyl methacrylate or hydroxybutyl methacrylate.

Preparation of the Oxetane-Based Macromonomers

The inventive oxetane-based macromonomers are obtainable by the inventive preparation process in which at least one hydroxyoxetane of the formula (I)

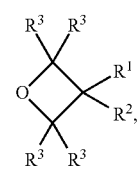

(I)

in which

R$^1$ is alkyl, alkoxy, alkoxyalkyl, aryloxyalkyl, hydroxyalkyl, hydroxyalkoxy, hydroxyalkoxyalkyl, aryl, aryloxy, hydroxyaryl or hydroxyaryloxy, R$^2$ is hydroxyalkyl, hydroxyalkoxy, hydroxyalkoxyalkyl, hydroxyaryl or hydroxyaryloxy, and R$^3$ is in each case independently hydrogen, alkyl, alkoxy, alkoxyalkyl, aryloxyalkyl, hydroxyalkyl, hydroxyalkoxy, hydroxyalkoxyalkyl, aryl, aryloxy, hydroxyaryl or hydroxyaryloxy, is reacted with a starter molecule U-L-X—H in which U=an ethylenically unsaturated, free-radically polymerizable head group other than allyl [H$_2$C=CH—CH$_2$—], L=divalent organic radical without free-radically polymerizable groups, and X—H=group which cannot be polymerized free-radically and has an active hydrogen atom H, in a molar ratio (hydroxyoxetane(s) of the formula (I): starter molecule) of (100:1) to (1:1) in the presence of at least one suitable catalyst in a cationic ring-opening polymerization.

Preferably, the molar ratio (hydroxyoxetane(s) of the formula (I):starter molecule) is from (50:1) to (2:1), more preferably from (25:1) to (3:1).

It is essential to the invention that the inventive oxetane-based macromonomers each contain one free-radically polymerizable group as a head group per molecule. This makes it possible to obtain polymers with defined comb structure in a subsequent free-radical homo- or copolymerization of the macromonomers. As is well known, however, by-products regularly occur in chemical synthesis. In the synthesis of the inventive macromonomers, it is therefore also possible for small proportions of macromonomers having two or more free-radically polymerizable groups and small proportions of products without a free-radically polymerizable group to be obtained. By virtue of the inventive preparation process, the proportions of such by-products can, however, be kept very low. The macromonomers synthesized in accordance with the invention therefore preferably have only very small, and more preferably do not have any, proportions of molecules having none or more than one free-radically polymerizable group.

The inventive macromonomers are prepared by cationic oxetane ring-opening polymerization of the hydroxyoxetanes with the starter molecule at about 30° C. to 130° C., preferably at about 50° C. to 110° C., in the presence of at least one suitable catalyst.

Suitable catalysts for the cationic oxetane ring-opening polymerization are, for example, Lewis acids, such as especially AlCl$_3$, BF$_3$, TiCl$_4$, ZnI$_2$, SiF$_4$, SbF$_5$, PF$_5$, AsF$_5$ or SbCl$_5$, and, for example, halogenated acids, such as especially FSO$_3$H, ClSO$_3$H, HClO$_4$, HIO$_4$ or CF$_3$SO$_3$H, and further Brønsted acids (e.g. paratoluenesulfonic acid, sulfonic acid). The catalysts used may also be onium salts, for example a sulfonium, oxonium and/or iodonium salt. Examples of such compounds are benzyltetramethylenesulfonium hexafluoroantimonate, benzyltetramethylenesulfonium hexafluorophosphate and benzyltetramethylenesulfonium trifluoromethanesulfonate. The catalyst used is preferably $CF_3SO_3H$ (trifluoromethanesulfonic acid), since the ethylenically unsaturated head groups of the starter molecule U-L-X—H are as far as possible not to be impaired during the cationic oxetane ring-opening polymerization, and more particularly are not to be polymerized prematurely, but rather the unsaturated groups are to be very substantially preserved. This is facilitated by the use of a gentle catalyst in this respect for the cationic polymerization, for example trifluoromethanesulfonic acid.

The inventive macromonomers are preferably prepared in the presence of an inhibitor of free-radical polymerization. Suitable inhibitors of free-radical polymerization are, for example, hydroquinone or hydroquinone monomethyl ether. The inhibitor of the free-radical polymerization is used to scavenge free radicals which could possibly form during the storage or in the course of thermally promoted cationic ring-opening polymerization of the oxetane monomers, such that the stability of the ethylenically unsaturated, free-radically polymerizable head group U of the starter molecule is ensured. One advantage in the case of use of an inhibitor of free-radical polymerization is thus that the conduct of the reaction is facilitated and a lower level of by-products is obtained.

Preferably, the hydroxyoxetane(s) is/are added gradually to the preheated reaction mixture comprising the starter molecule U-L-X—H and the at least one acidic catalyst, and preferably also the at least one inhibitor of free-radical polymerization. The gradual addition of the hydroxyoxetane(s) allows better-defined products to be obtained.

It is possible to use solvents. However, these must not affect the cationic oxetane ring-opening polymerization. Suitable solvents are, for example, those which do not contain any active hydrogen atoms, any polymerizable rings or any groups which could react with the hydroxyoxetane (especially with the hydroxyl groups of the hydroxyoxetane), with the starter molecule or with the oxetane-based macromonomer. Preferably, it is possible to use aliphatic, cycloaliphatic and aromatic solvents, ketones and blocked polyethers as solvents. The choice of the solvent is also guided by the later end use of any polymer to be synthesized subsequently from the macromonomers. Preference is given to using low-boiling solvents in order to facilitate the distillative removal in those applications in which the polymers obtained later are to be used as a 100% formulation, for example in the case of UV-curing paint systems.

At the end of the reaction, the product is cooled and neutralized by addition of a base or by treatment with a basic ion exchange resin. Any residual amounts of starter molecule, if they are disruptive in the subsequent free-radical polymerization, can be removed by suitable distillation measures, for example by thin-film evaporation.

The performance of the cationic ring-opening polymerization of the hydroxyoxetanes with the starter molecule U-L-X—H is facilitated by the selection of particular starter molecules U-L-X—H. In general, the reaction can be conducted particularly efficiently with starter molecules from the group of the esters of (meth)acrylic acid. In contrast, the conduct of the reaction can be somewhat more difficult in the case of use of corresponding amides or of vinylbenzyl alcohols as starter molecules.

The oxetane-based macromonomer can be modified further by polymer-analogous reactions prior to any free-radical polymerization which follows later. For example, all or some of the free hydroxyl groups can be esterified, for example with acetic acid. Esterification may be useful, for example, to avoid intermediate layer adhesion problems in paint systems when the polymers are used, or to alter the polarity of the polymer. All or some of the free hydroxyl groups in the macromonomer(s) can be reacted with isocyanates, for example with alkyl isocyanates. A modification with relatively long-chain alkyl isocyanates, for example stearyl isocyanate, prior to the free-radical polymerization can alter the polarity of the polymer in the direction of hydrophobicity such that use of the polymers in nonpolar thermoplastics is facilitated. In contrast, an increase in hydrophilicity and possibly improved water solubility are achieved by reacting all or some of the free hydroxyl groups of the macromonomer(s), prior to the free-radical polymerization, with hydrophilic compounds, for example with TDI monoadducts. Suitable examples are monoadducts which from the reaction of tolylene diisocyanate (TDI) with methanol-started polyethylene glycol. By means of appropriate mixtures of hydrophilic and hydrophobic modifications of the macromonomers prior to the free-radical polymerization, it is also possible to prepare amphiphilic polymer structures.

Use

Polymers are obtainable from the inventive macromonomers and optionally further comonomers by free-radically polymerizing one or more of the macromonomers obtainable by reaction of at least one hydroxyoxetane of the formula (I)

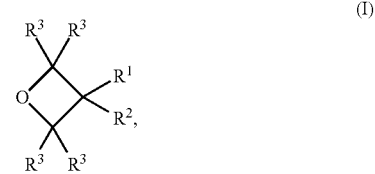

in which $R^1$ is alkyl, alkoxy, alkoxyalkyl, aryloxyalkyl, hydroxyalkyl, hydroxyalkoxy, hydroxyalkoxyalkyl, aryl, aryloxy, hydroxyaryl or hydroxyaryloxy, $R^2$ is hydroxyalkyl, hydroxyalkoxy, hydroxyalkoxyalkyl, hydroxyaryl or hydroxyaryloxy, and $R^3$ is in each case independently hydrogen, alkyl, alkoxy, alkoxyalkyl, aryloxyalkyl, hydroxyalkyl, hydroxyalkoxy, hydroxyalkoxyalkyl, aryl, aryloxy, hydroxyaryl or hydroxyaryloxy, with a starter molecule U-L-X—H in which U=an ethylenically unsaturated, free-radically polymerizable head group other than allyl [$H_2C=CH-CH_2-$], L=divalent organic radical without free-radically polymerizable groups, and X—H=group which cannot be polymerized free-radically and has an active hydrogen atom H, in a molar ratio (hydroxyoxetane(s) of the formula (I): starter molecule) of (100:1) to (1:1) in the presence of at least one suitable catalyst in a cationic ring-opening polymerization, and optionally one or more further, free-radically polymerizable comonomers.

To prepare the polymers, one or more different inventive macromonomers can be free-radically homo- or copolymerized. Among the inventive macromonomers, the polymers are preferably prepared using those macromonomers which are obtained according to the above-described preferred embodiments.

In addition to the inventive macromonomer(s), it is possible to polymerize one or more different free-radically polymerizable comonomers. Preference is given to using at least one such comonomer. Free-radically polymerizable comonomers are understood to mean those compounds which bear at least one free-radically polymerizable group. Free-radically polymerizable groups are understood to mean functional groups which can be free-radically polymerized under conditions customary therefor, for example ethylenically unsaturated groups. This ethylenically unsaturated group is preferably selected from the group consisting of substituted or unsubstituted acryloyl, methacryloyl, acrylamido, methacrylamido, acrylamidoalkyl, methacrylamidoalkyl, styryl, alpha-methylstyryl, allyl, vinylbenzyl, vinyl ether, vinyl ester and vinyl ketone groups; especially when the macromonomers used bear acryloyl, methacryloyl or styrene groups as the head group U.

Examples of suitable comonomers are alkyl acrylates and alkyl methacrylates of straight-chain, branched or cycloaliphatic alcohols having 1 to 24 carbon atoms, aralkyl acrylates and aralkyl methacrylates of aralkyl alcohols having 8 to 18 carbon atoms, hydroxyalkyl(meth)acrylates of straight-chain, branched or cycloaliphatic diols having 2 to 36 carbon atoms, alkyl(meth)acrylamides of straight-chain, branched or cycloaliphatic amines having 1 to 22 carbon atoms, aminoalkyl(meth)acrylates of straight-chain, branched or cycloaliphatic amino alcohols having 2 to 8 carbon atoms, alkoxylated (meth)acrylates (for example polyethylene oxide (meth)acrylates, polypropylene oxide (meth)acrylates, polyethylene glycol-polypropylene oxide (meth)acrylates, polyester-modified (meth)acrylates (for example caprolactone-modified (meth)acrylates, obtainable, for example, from Daicel, Japan), (meth)acrylonitriles, vinyl alkanoates, alkenes and arylalkenes having 2 to 30 carbon atoms, styrenes and substituted styrenes, alpha-methylstyrenes and substituted alpha-methylstyrenes, alkyl vinyl ethers, perfluoroalkyl(meth)acrylates and corresponding partially fluorinated (meth)acrylates, perfluoroalkyl block polyether (meth)acrylates, perfluoroalkylethylthiocarbonylaminoethyl(meth)acrylates, perfluoro-olefins, (meth)acryloyloxyalkylsiloxanes, (meth)acryloyloxyalkylpolysiloxanes, (meth)acryloyloxypolyetheralkylpolysiloxanes, N-vinylcarbazoles, fluorinated and fluorine-free alkyl esters of maleic acid, of fumaric acid, of itaconic acid and of mesaconic acid (methylfumaric acid), (meth)acrylamide, (meth)acrylamides, methacrylic acid, acrylic acid, hydroxy-functional alkyl (meth)acrylamides, hydroxy-functional alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazolidine, 2-vinylpyridine, 4-vinylpyridine, 1-[2-(methacryloyloxy)ethyl]-2-imidazolidinone, aminoalkyl(meth)acrylates, for example N,N-dimethylaminoethyl(meth)acrylate and N,N-dimethylaminopropyl(meth)acrylate, N-alkyl- and N,N-dialkyl-substituted acrylamides having straight-chain, branched or cycloaliphatic alkyl groups having 1 to 22 carbon atoms, for example N-(t-butyl)acrylamide and N,N-dimethylacrylamide; ionic monomers, allyl alcohol, alkoxylated allyl alcohol derivatives (for example ethoxylated allyl alcohol, propoxylated allyl alcohol and mixed-alkoxylation allyl alcohol containing proportions of ethylene oxide and propylene oxide) and polyester-modified (for example by means of caprolactone) derivatives based on allyl alcohol.

Preference is given to using comonomers such as polydimethylsiloxane mono(meth)acrylates, for example linear (meth)acryloyloxyalkylpolydimethylsiloxanes (e.g. α-butyldimethylsiloxy-ω-(3-methacryloyloxypropyl)polydimethylsiloxane or α-butyldimethylsiloxy-ω-(3-acryloyloxy-2-hydroxypropoxypropyl)polydimethylsiloxane), branched (meth)acryloyloxyalkylpolydimethylsiloxanes (e.g. methacryloyloxypropyl-terminated, branched polydimethylsiloxanes such as (methacryloyloxypropyl)methylsiloxane-polydimethylsiloxane copolymers or methacryloyloxypropylpolydimethylsiloxanes of T-shaped structure), (meth)acrylpolyetheralkylpolydimethylsiloxanes (e.g. α-butyldimethylsiloxy-ω-(3-methacryloyloxy(polyethylene oxide)propyl)polydimethylsiloxane) or polydimethylsiloxanemonoalkenes, more preferably polydimethylsiloxane mono(meth)acrylates. This gives copolymers which, as additives, can be used to good effect for reducing the surface tension in coating compositions and plastics or for obtaining scratch-resistant surfaces with a long-lasting antifingerprint effect and dirt-repellent properties.

Preference is given to using fluorinated comonomers. This gives copolymers which, as additives, have especially good usability as flow control agents, for reducing the surface tension in coating compositions and plastics or for obtaining dirt-repellent surfaces.

Preference is given to using esters of (meth)acrylic acid with alkanols, for example with C1-C14-monohydroxyalkanes, as comonomers. This gives copolymers which, as additives, have especially good usability for improving the levelling, gloss and/or opalescence of the coating compositions or coatings or plastics. It is possible to use, for example, n-butyl acrylate, i-butyl acrylate, t-butyl acrylate, methyl acrylate, ethyl acrylate, propyl acrylate, hexyl acrylate, 2-ethylhexyl acrylate, cyclohexyl acrylate, lauryl acrylate, tetradecyl acrylate, isobornyl acrylate, n-butyl methacrylate, i-butyl methacrylate, t-butyl methacrylate, methyl methacrylate, ethyl methacrylate, propyl methacrylate, hexyl methacrylate, 2-ethylhexyl methacrylate, cyclohexyl methacrylate, lauryl methacrylate, tetradecyl methacrylate and/or isobornyl methacrylate. Further preferred monomers are hydroxyethyl acrylate, hydroxybutyl acrylate, hydroxyethyl methacrylate, hydroxybutyl methacrylate, 2-methoxyethyl acrylate, 2-methoxyethyl methacrylate, styrene, ethyl vinyl ether, butyl vinyl ether, hydroxybutyl vinyl ether, methacrylic acid and acrylic acid.

For the preparation of wetting agents and dispersants, adhesion promoters and emulsifiers, the following comonomers are also preferred: maleic anhydride, polyethylene glycol monomethacrylate, polypropylene glycol monomethacrylate, N,N'-dimethylaminoethyl methacrylate, N,N'-dimethylaminoethyl acrylate, 2-vinylpyridine, 4-vinylpyridine, vinylimidazole.

It is also possible with preference to use mixtures of the abovementioned preferred comonomers and mixtures of these comonomers with other comonomers.

The notation "(meth)acrylate" encompasses both acrylates and methacrylates.

Ionic groups can be introduced into the polymer as a corresponding ionic, ethylenically unsaturated monomer or be subsequently obtained by polymer-analogous reactions, for example salt formation or quaternization of tertiary amino compounds.

For example, it is possible to react acid functions in the polymer, for example carboxylic acids and phosphoric esters, with bases. It is also possible, proceeding from acid anhydrides such as maleic anhydride, firstly to generate the carboxylic acid function by hydrolysis with water or formation of a monoester or partial ester with monohydric alcohols or polyethers and then to react this with bases.

Oxirane structures in the polymer can be reacted with nucleophiles such as o-phosphoric acid and subsequent salt formation by means of bases to give ionic groups.

Hydroxy functions in the polymer can be reacted with polyphosphoric acid to form phosphoric esters and subsequent salt formation by means of bases to give ionic groups.

Suitable bases are, for example, amines, for example dimethylaminoethanol, diethanolamine, triethanolamine, 2-(dimethylamino)propan-1-ol, triethylamine, butylamine and dibutylamine, hydroxides, oxides, carbonates and hydrogencarbonates of metals of the 1st to 3rd main groups of the Periodic Table of the Elements, for example sodium hydroxide, potassium hydroxide, aluminum hydroxide and sodium hydrogencarbonate.

As described in U.S. Pat. No. 6,111,054, it is also possible to convert amines bound to the polymer to salts with carboxylic acids or phosphoric acids and esters thereof.

In addition, amines can be converted to quaternary ammonium salts in alkylation reactions with alkyl halides, for example benzyl chloride, or with a combination of oxirane with carboxylic acid.

Tertiary amines can be converted with oxygen, peroxo compounds such as percarboxylic acids and hydrogen peroxide to amine oxides, which can additionally be converted to salts with acids such as hydrochloric acid.

Examples of ionic, ethylenically unsaturated monomers can be taken from the following list, the notation "(meth) acrylate" including both acrylates and methacrylates: salts of acrylic acid, methacrylic acid or maleic acid; quaternary aminoalkyl(meth)acrylates such as 2-trimethylammonioethyl methacrylate chloride and 2-benzyldimethylammonioethyl (meth)acrylate chloride; salts of monomers containing phosphoric acid, for example sodium tripropylene glycol methacrylate phosphate.

Self-crosslinking polymers can be prepared in a controlled manner by, for example, the use of epoxy-functional comonomers, e.g. glycidyl acrylate and glycidyl methacrylate, or by means of silane-functional comonomers.

The polymers may be homopolymers or copolymers. The polymers are preferably copolymers.

If one or more comonomers are also used in the free-radical polymerization of the inventive oxetane-based macromonomer(s), the proportion of units of the inventive oxetane-based macromonomer(s) in the copolymer formed is preferably 1 to 60 mol %, more preferably 2 to 30 mol % and most preferably 2 to 15 mol % of macromonomer units, based in each case on the overall copolymer.

The polymers can be prepared by free-radical polymerization in a manner known to those skilled in the art in organic solvents or in bulk, in the presence of free-radical initiators such as peroxides or azo compounds. Useful solvents include especially esters, for example ethyl acetate, n-butyl acetate or 1-methoxy-2-propyl acetate, and aromatic solvents, for example toluene or xylene, and ketones, for example methyl isobutyl ketone or methyl ethyl ketone. The choice of solvent is also guided by the later end use of the polymer. Preference is given to using low-boiling solvents in order to facilitate the distillative removal of the solvents in the case of applications in which the polymers are to be used as a 100% product, for example in UV-curing coating systems or in polymers.

The free-radical polymerization is performed at temperatures of approx. 40° C. to 138° C., preferably 60° C. to 150° C., more preferably 80° C. to 130° C.

The free-radical polymerization can be performed as a continuous or batchwise process.

The free-radical polymerization can be performed, for example, as a bulk polymerization, as a solution polymerization, as a precipitation polymerization, as an emulsion polymerization or as a suspension polymerization.

The free-radical polymerization can be performed as an uncontrolled free-radical polymerization or as a controlled free-radical polymerization.

Methods of controlled free-radical polymerization make it possible to achieve better-defined polymer architectures having a narrower molecular weight distribution. It is possible to use the methods known to those skilled in the art for controlled free-radical polymerization, for example ATRP (atom transfer radical polymerization), GTP (group transfer polymerization), NMP (nitroxide mediated polymerization), RAFT (reversible addition fragmentation chain transfer process) or MADIX (macromolecular design via the interchange of xanthates).

Controlled polymerization processes include, in particular, the "reversible addition fragmentation chain transfer process" (RAFT), which, in the case of use of particular polymerization regulators, is also referred to as "MADIX" (macromolecular design via the interchange of xanthates) and "addition fragmentation chain transfer". RAFT is described, for example, in Polym. Int. 2000, 49, 993, Aust. J. Chem 2005, 58, 379, J. Polym. Sci. Part A: Polym. Chem. 2005, 43, 5347, Chem. Lett. 1993, 22, 1089, J. Polym. Sci., Part A 1989, 27, 1741 and 1991, 29, 1053 and 1993, 31, 1551 and 1994, 32, 2745 and 1996, 34, 95 and 2003, 41, 645 and 2004, 42, 597 and 2004, 42, 6021, and also in Macromol. Rapid Commun. 2003, 24, 197 and in U.S. Pat. No. 6,291,620, WO 98/01478, WO 98/58974 and WO 99/31144.

A further process for controlled polymerization makes use of nitroxyl compounds as polymerization regulators (NMP) and is disclosed, for example, in Chem. Rev. 2001, 101, 3661.

Another controlled polymerization process is "group transfer polymerization" (GTP), as disclosed, for example, by O. W. Webster in "Group Transfer Polymerization", in "Encyclopedia of Polymer Science and Engineering", Volume 7, H. F. Mark, N. M. Bikales, C. G. Overberger and G. Menges, Eds., Wiley Interscience, New York 1987, page 580 ff., and in O. W. Webster, Adv. Polym. Sci. 2004, 167, 1-34.

Controlled free-radical polymerization using tetraphenylethane, as described, for example, in Macromol. Symp. 1996, 111, 63, is a further example of controlled polymerization.

Controlled free-radical polymerization using 1,1-diphenylethene as polymerization regulator is described, for example, in Macromolecular Rapid Communications 2001, 22, 700.

Controlled free-radical polymerization using iniferters is disclosed, for example, in Makromol. Chem. Rapid. Commun. 1982, 3, 127.

Controlled free-radical polymerization using organocobalt complexes is known, for example, from J. Am. Chem. Soc. 1994, 116, 7973, from Journal of Polymer Science: Part A: Polymer Chemistry, Vol. 38, 1753-1766 (2000), from *Chem. Rev.* 2001, 101, 3611-3659 and from *Macromolecules* 2006, 39, 8219-8222.

A further controlled polymerization technique is degenerative chain transfer using iodine compounds as described, for example, in Macromolecules 2008, 41, 6261 or in U.S. Pat. No. 7,034,085.

Controlled free-radical polymerization in the presence of thioketones is described, for example, in Chem. Commun., 2006, 835-837 and in Macromol. Rapid Commun. 2007, 28, 746-753.

The polymer may be a homopolymer or a copolymer. Copolymers can be random copolymers, block copolymers or gradient copolymers and may be made up of two or more, hydrophilic and/or hydrophobic monomers.

The number-average molecular weight of the polymers is in the range from 1500 to 200 000, preferably 5000 to 75 000, more preferably in the range from 7500 to 50 000. The number-average molecular weight of the polymers is determined by gel permeation chromatography with tetrahydrofuran as the eluent and using polystyrene standards.

To influence the number-average molecular weight and the molecular weight distribution of the polymers, it is possible to use suitable control or chain transfer reagents. Examples include thiols such as n-octyl mercaptan, n-dodecyl mercaptan or t-dodecyl mercaptan and dimers of alpha-methylstyrene. For example, it is possible also to use small amounts of difunctional monomers (e.g. hexanediol diacrylate) in the polymerization in order to increase the molecular weight in a controlled manner.

The polymers can subsequently be modified by means of polymer-analogous reactions. For example, subsequent reaction with maleic anhydride enables a reactive double bond and an acid function to be incorporated. This acid function can also, for example, be converted to a salt by means of triethanolamine to improve solubility in water. Furthermore, subsequent transesterification (chemical or enzymatic transesterification) with hydroxy-functional (meth)acrylates makes it possible to obtain products which can be incorporated in a fixed manner into surface coating systems even in radiation-curing processes such as UV and electron beam curing. It is also possible to esterify free OH groups by, for example, subsequent reaction with acetic anhydride in order to be able to avoid potential intermediate layer adhesion problems when the polymers are employed as flow control agents in surface coatings.

Use of the Polymers as Additives

The polymers can be used, for example, as additives in coating compositions or plastics. Plastics are understood to mean polymeric molding compositions and thermoplastics.

The polymers can be used, for example, as flow control agents in coating compositions in order to improve, for example, the optical properties of the resulting coating. The use of polymers as flow control agents enables improvement, for example, in the levelling, the gloss and/or the opalescence of the coating compositions or coatings or plastics.

The polymers can also be used, for example, to alter the surface properties of coatings, polymeric molding compositions and thermoplastics. The addition of the polymers can influence the surface energy of coatings, polymeric molding compositions and thermoplastics. The surface can be made more hydrophilic or else more hydrophobic, such that adhesion to this surface is improved or else is prevented, which makes it possible to obtain dirt-repellent, easy-to-clean surfaces. In general, an increase in the surface energy achieves more hydrophilic surfaces which can be wetted more easily and offer better adhesion conditions. On the other hand, a reduction in the surface energy generally gives more hydrophobic surfaces which are more difficult to wet and have dirt-repellent, non-stick properties. Polymers which are suitable for increasing the surface energy can be obtained, for example, by polymerization of comparatively hydrophilic inventive macromonomers (for example based on ethoxylated TMPO) or by copolymerization with rather hydrophilic comonomers (for example hydrophilic acrylates such as polyethylene oxide (meth)acrylates or (meth)acrylic acid). Polymers which are suitable for reducing the surface energy can be obtained, for example, by polymerization of comparatively hydrophobic inventive macromonomers (for example based on TMPO or propoxylated TMPO) or by copolymerization with rather hydrophobic or particularly suitable comonomers, for example comonomers containing perfluoro groups and/or polysiloxane groups.

Additives for Achieving Dirt-Repellent, Non-Stick Surfaces

The copolymers which can be added to coating compositions, polymeric molding compositions and thermoplastics and whose addition makes it possible to achieve dirt-repellent, easy-to-clean, non-stick surfaces can be prepared, for example, via the polymerization of at least one inventive macromonomer or copolymerization of at least one inventive macromonomer and at least one comonomer, for example a comonomer containing perfluoro groups and/or polysiloxane groups.

Coating compositions, polymeric molding compositions and thermoplastics to which appropriate copolymers are added have excellent non-stick and dirt-repellent properties. The copolymers also do not have any significant adverse effect on the other properties of the coating compositions or coatings, polymeric molding compositions or thermoplastics. These copolymers can be added in relatively small amounts (additive amounts) to the coating compositions, polymeric molding compositions or thermoplastics. Particularly in coating compositions and plastics such as polymeric molding compositions and thermoplastics, the polymers can preferably also be used in relatively small amounts of 0.01 to 5% by weight, preferably of 0.05 to 2% by weight and more preferably of 0.1 to 1% by weight, based in each case on the overall coating composition or the overall plastic.

The physical properties of the original coating compositions or coatings, polymeric molding compositions and thermoplastics, for example in respect of corrosion protection, maintenance of gloss and weathering resistance, are not adversely affected by the small concentrations of the additive. Coating compositions or coatings, polymeric molding compositions and thermoplastics containing the copolymers generally exhibit the desired properties over a period of many years and retain these properties even over many cleaning cycles.

Furthermore, it has been found to be particularly advantageous that the hydroxyl groups of the oxetane-based macromonomer units in the polymers can crosslink with reactive groups of the binder and thus ensure a permanent effect.

The use of the polymers as additives in coating compositions, polymeric molding compositions or thermoplastics also makes it possible to obtain surfaces having antistatic properties or antifogging properties.

Additives for Achieving Readily Wettable Surfaces

The copolymers can be added to coating compositions, polymeric molding compositions and thermoplastics, such that the addition thereof increases the surface energy of the coatings, polymeric molding compositions and thermoplastics, such that the wettability of these surfaces is improved.

Coatings, polymeric molding compositions and thermoplastics to which appropriate copolymers are added have highly wettable surfaces. The wettability can be determined by determining the contact angle of the surface towards water by the customary methods. For hydrophilic surfaces, the contact angle should be <60°. The copolymers also do not have any significant adverse effect on the other properties of the coating compositions or coatings, polymeric molding compositions or thermoplastics. These copolymers can be added in relatively small amounts (additive amounts) to the coating compositions, polymeric molding compositions or thermoplastics, preferably in amounts of 0.01 to 5% by weight, preferably of 0.05 to 2% by weight and more preferably of 0.1 to 1% by weight, based in each case on the overall coating composition or the overall plastic. The physical properties of the original coating compositions or coatings, polymeric molding compositions and thermoplastics, for example in respect of corrosion protection, maintenance of gloss and weathering resistance, are not adversely affected by the small concentrations of the additive. Coating compositions or coatings, polymeric molding compositions and thermoplastics containing the copolymers generally exhibit the desired properties over a period of many years and retain these properties even over many cleaning cycles.

Furthermore, it has been found to be particularly advantageous that the hydroxyl groups of the oxetane-based macromonomer units in the polymers can crosslink with reactive groups of the binder and thus ensure a permanent effect.

Wetting Agents and Dispersants

The polymers can also be used as dispersants in the fields of use for dispersants which are known from the prior art, the polymers being usable as dispersants instead of or in combination with the dispersants known from the prior art. For example, they can be used in the production or processing of surface coatings, printing inks, paper coatings, leather and textile colorants, pastes, pigment concentrates, ceramics or cosmetic preparations, particularly when they contain solids such as pigments and/or fillers. They can also be used in the production or processing of casting and/or molding compositions based on synthetic, semisynthetic or natural macromolecular substances, for example polyvinyl chloride, saturated or unsaturated polyesters, polyurethanes, polystyrene, polyacrylate, polyamide, epoxy resins, polyolefins such as polyethylene or polypropylene. For example, the copolymers can be used for producing casting compositions, PVC plastisols, gel coats, polymer concrete, circuit boards, industrial surface coatings, surface coatings for wood and furniture, vehicle paint systems, ship paints, corrosion protection paints, can and coil coatings, trade paints and masonry paints, with mixing of binders and/or solvents, pigments and if appropriate fillers, the comb copolymers and customary additives. Examples of customary binders are resins based on polyurethane, cellulose nitrate, cellulose acetobutyrate, alkyd, melamine, polyester, chloro rubber, epoxide and acrylate. Examples of water-based coatings are cathodic or anodic electrophoretic coatings, for example for automobile bodies. Further examples are plasters and renders, silicate paints, emulsion paints, water-based paints based on water-dilutable alkyds, alkyd emulsions, hybrid systems, two-component systems, polyurethane dispersions and acrylate dispersions.

The copolymers are also particularly suitable as dispersants for producing concentrates of solids, for example pigment concentrates. For this purpose, the copolymers are, for example, initially charged in a carrier medium such as an organic solvent, plasticizer and/or water, and the solids to be dispersed are added while stirring. These concentrates may additionally contain binders and/or other auxiliaries. With the copolymers, however, it is especially possible to produce stable binder-free pigment concentrates. It is likewise possible to use the polymers to produce flowable solids concentrates from pigment presscakes. This is done by mixing the copolymers into the presscake, which can still contain organic solvents, plasticizers and/or water, and dispersing the mixture obtained in this way. The solids concentrates produced in various ways can then be incorporated into various substrates, for example alkyd resins, polyester resins, acrylate resins, polyurethane resins or epoxy resins. However, pigments can also be dispersed directly into the copolymers in the absence of solvents and are then particularly suitable for pigmenting thermoplastic and thermoset polymer formulations.

The copolymers can also be used advantageously in the production of inks for "non-impact" printing processes such as "thermal inkjet" and the "bubblejet process". These inks may, for example, be aqueous ink formulations, solvent-based ink formulations, solvent-free or low-solvent inks for UV applications, or else wax-like inks.

The copolymers can also be used advantageously in the production of color filters for liquid-crystal displays, liquid-crystal VDUs, color resolution instruments, sensors, plasma screens, displays based on SED (surface conduction electron-emitter display) and for MLCC (multilayer ceramic compounds). In this case, the liquid color filter paint, also referred to as color resist, can be applied by a variety of application processes such as spin coating, knife coating, a combination of the two or by "non-impact" printing processes such as inkjet processes. MLCC technology is used in the production of microchips and circuit boards.

The copolymers can also be used to produce cosmetic preparations, for example makeup, powder, lipsticks, hair colors, creams, nail varnishes and sun protection preparations. These may be present in the usual forms, for example as W/O or O/W emulsions, solutions, gels, creams, lotions or sprays. The copolymers can be used advantageously in dispersions used to produce these preparations. These may contain the carrier media customary for these purposes in cosmetics, for example water, castor oils or silicone oils, and solids, for example organic and inorganic pigments such as titanium dioxide or iron oxide.

Finally, such a dispersant can also be used to produce a pigmented coating on a substrate, by applying the pigmented coating material to the substrate and baking or curing or crosslinking the pigmented coating material applied to the substrate.

The copolymers can be used alone or together with binders customary in the art. When they are used in polyolefins, it may be advantageous, for example, to use appropriate low molecular weight polyolefins as carrier materials together with the comb copolymer.

Another possible use of the copolymers is the production of dispersible powder-particulate and/or fiber-particulate solids, in particular dispersible pigments or polymeric fillers, the particles being coated with the comb copolymer. Such coatings of organic and inorganic solids are executed in a known manner, as described, for example, in EP-A-0 270 126. In this case, the solvent or emulsion medium can either be removed or remain in the mixture to form pastes. These pastes are conventional commercial products and may additionally contain binders and further auxiliaries and additives. Especially in the case of pigments, the pigment surface can be coated during or after the synthesis of the pigments, for example by addition of the copolymers to the pigment suspension or during or after pigment finishing. The pigments which have been pretreated in this way are notable for easier incorporability and for improved viscosity, flocculation and gloss characteristics, and higher color strength compared to untreated pigments.

Examples of pigments are monoazo, diazo, triazo and polyazo pigments, oxazine pigments, dioxazine pigments, thiazine pigments, diketopyrrolopyrroles, phthalo-cyanines, ultramarine and other metal complex pigments, indigoid pigments, diphenylmethane, triarylmethane, xanthene, acridine, quinacridone and methine pigments, anthraquinone, pyranthrone and perylene pigments and other polycyclic carbonyl pigments. Further examples of organic pigments may be found in the monograph: W. Herbst, K. Hunger "Industrial Organic Pigments", 1997 (publisher: Wiley-VCH, ISBN: 3-527-28836-8). Examples of inorganic pigments are pigments based on carbon black, graphite, zinc, titanium dioxide, zinc oxide, zinc sulfide, zinc phosphate, barium sulfate, lithopone, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminum (for example nickel titanium yellow, bismuth vanadate molybdate yellow or chromium titanium yellow). Further examples are given in the monograph: G. Buxbaum "Industrial Inorganic Pigments", 1998 (publisher: Wiley-VCH, ISBN: 3-527-28878-3). Inorganic pigments may also be magnetic pigments based on pure iron, iron oxides and chromium oxides or mixed oxides, metal effect pigments comprising aluminum, zinc, copper or brass and also pearl sheen pigments, fluorescent and phosphorescent luminous pigments. Further examples are nanosize organic or inorganic solids having particle sizes below 100 nm, such as certain types of carbon black or particles consisting of a metal or semimetal oxide or hydroxide, and also particles consisting of mixed metal and/or semimetal oxides or hydroxides. For example, the oxides and/or oxide hydroxides of aluminum, silicon, zinc, titanium, etc., can be used to produce such extremely finely divided solids. These oxide or hydroxide or oxide-hydroxide particles can be produced by a wide variety of different processes, for example ion-exchange processes, plasma processes, sol-gel processes, precipitation, comminution (for example by milling) or flame hydrolysis, etc. These nanoscale solids may also be what are called hybrid particles, which consist of an inorganic core and an organic shell, or vice versa.

Examples of pulverulent or fibrous fillers are, for example, those which are made up of pulverulent or fibrous particles of aluminum oxide, aluminum hydroxide, silicon dioxide, kieselguhr, diatomaceous earth, quartz, silica gel, talc, kaolin, mica, perlite, feldspar, ground shale, calcium sulfate, barium sulfate, calcium carbonate, calcite, dolomite, glass or carbon. Further examples of pigments or fillers can be found, for example, in EP-A-0 270 126. It is also possible to achieve excellent dispersion and stabilization of flame retardants, for example aluminum hydroxide or magnesium hydroxide, and matting agents, for example silicas.

The copolymers can also be used as an emulsifier for emulsions. Since emulsions are typically unstable systems which do not form spontaneously, interdispersion of the phases being obtainable only by shaking, stirring, homogenization or spray processes, emulsifiers are used to stabilize these unstable structures. The use of emulsifiers avoids separation of the phases.

The copolymers can also be used as rheological additives.

The copolymers can also be used as adhesion promoters.

The polymers can be used in coating compositions, polymeric molding compositions, thermoplastics or other compositions within relatively wide ranges of amounts of 0.01 to 100% by weight, preferably 0.05 to 50% by weight, most preferably of 0.1 to 40% by weight, based in each case on the overall coating composition or the overall plastic.

Especially in coating compositions and plastics, such as polymeric molding compositions and thermoplastics, the polymers can preferably also be used in relatively small amounts of 0.01 to 5% by weight, preferably of 0.05 to 2% by weight and more preferably of 0.1 to 1% by weight, based in each case on the overall coating composition or the overall plastic.

The polymers can be used as solutions, emulsions or as 100% materials, depending on the type and method of application of the coating composition, the polymeric molding composition, the thermoplastic or the alternative composition.

EXAMPLES

Abbreviations

"TMPO"=3-ethyl-3-(hydroxymethyl)oxetane
"TMPO-EOX"=3-ethyl-3-(hydroxymethyl)oxetane, modified with an average of
3.3 mol of ethylene oxide
"HEMA"=2-hydroxyethyl methacrylate
"BA"=butyl acetate
"EHA"=2-ethylhexyl acrylate
"IBMA"=isobutyl methacrylate
"STY"=styrene
"DMAEMA"=2-(N,N-dimethylamino)ethyl methacrylate
"AA"=acrylic acid
"PMA"=1-methoxy-2-propyl acetate (e.g. Dowanol PMA)
Trigonox C (=tert-butyl perbenzoate) is a free-radical polymerization initiator (obtainable from Akzo Nobel Chemicals).
Perkadox AMBN (=2,2'-azobis(2-methylbutyronitrile) is a free-radical polymerization initiator (obtainable from Akzo Nobel Chemicals).
Silaplane FM0721 is a polysiloxane monomethacrylate (Mw~5000), obtainable from Chisso Corp.
BLEMMER PME-1000 is a linear methoxy polyethylene glycol monomethacrylate
(Mw~1000) obtainable from NOF CORPORATION.
BISOMER MPEG550MA is a linear methoxy polyethylene glycol monomethacrylate (Mw~628), obtainable from Cognis.
Fluowet MA600 is a fluorinated methacrylate from Clariant (3,3,4,4,5,5,6,6,7,7,8,8,8-tridecafluorooctyl methacrylate).
Amberlyst IR120H is a cation exchange resin from Rohm & Haas.
Amberlyst A-21 is an anion exchange resin from Rohm & Haas.
Analysis Methods:
Size Exclusion Chromatography (SEC):
Size exclusion chromatography was conducted at 40° C. with a high-pressure liquid chromatography pump (Bischoff HPLC 2200) and a refractive index detector (Waters 419). The eluent used was tetrahydrofuran (THF) with an elution rate of 1 ml/min. Conventional calibration was conducted by means of polystyrene standards. The number-average molecular weight Mn, the weight-average molecular weight Mw and the polydispersity Q=Mw/Mn were calculated by the program NTeqGPC.
NMR Spectroscopy:
NMR analyses were conducted with an NMR system (Bruker DPX 300) at 300 MHz ($^1$H) or 75 MHz ($^{13}$C). The solvents used were deuterated chloroform ($CDCl_3$) and deuterated dimethyl sulfoxide (DMSO-cd).

Example 1

Synthesis of the Inventive Macromonomers

Macromonomer 1
Preparation:
100 g of HEMA were introduced at room temperature into a reaction vessel which was equipped with a mechanical stirrer, an addition funnel, a thermometer, a heating jacket and a condenser. The reaction was conducted under standard atmosphere (air).
178.4 g of TMPO and 200 g of TMPO-EOX were introduced into the addition funnel and mixed therein. The mixture of the oxetane monomers was homogeneous. 240 mg of hydroquinone and 240 mg of 2,6-di-tert-butyl-4-methylphenol were added to the starter molecule (HEMA) in the reaction vessel. The mixture was stirred until a solution was obtained. To this was added 0.36 g of trifluoromethanesulfonic acid as a catalyst, and the temperature was increased to 80° C.

The mixture of the oxetane monomers was subsequently added dropwise continuously over the course of 8 hours, in the course of which the temperature was controlled such that it did not exceed 80° C. On completion of addition of the mixture of the oxetane monomers, the reaction mixture was stirred at 80° C. for a further 2 hours.

Then the reaction mixture was cooled to room temperature and the viscous product was dissolved in 160 g of PMA. The catalyst was neutralized with Amberlyst A-21 and the ion exchanger was filtered off.

Analysis of the Product:
 NMR: no oxetane present
 Hydroxyl number: 269 mg KOH/g
 Iodine number: 28.5 g $I_2$/100 g Macromonomer 2
Preparation:
 100 g of HEMA were introduced at room temperature into a reaction vessel which was equipped with a mechanical stirrer, an addition funnel, a thermometer, a heating jacket and a condenser. The reaction was conducted under standard atmosphere (air).

267.7 g of TMPO were introduced into the addition funnel.

184 mg of hydroquinone and 184 mg of 2,6-di-tert-butyl-4-methylphenol were added to the starter molecule (HEMA) in the reaction vessel. The mixture was stirred until a solution was obtained. To this was added 0.28 g of trifluoromethanesulfonic acid as a catalyst, and the temperature was increased to 75° C.

The oxetane monomer was subsequently added dropwise continuously over the course of 6 hours, in the course of which the temperature was controlled such that it did not exceed 80° C. On completion of addition of the oxetane monomer, the reaction mixture was stirred at 80° C. for a further hour.

Thereafter, the reaction mixture was cooled to room temperature and the viscous product was dissolved in 368 g of PMA. The catalyst was neutralized with Amberlyst A-21 and the ion exchanger was filtered off.

Analysis of the Product:
 NMR: no oxetane present
 Hydroxyl number: 214 mg KOH/g
 Iodine number: 24.9 g $I_2$/100 g Macromonomer 3
Preparation:
 A 1000-ml 4-neck flask with stirrer, thermometer, reflux condenser and dropping funnel is initially charged at room temperature with 67.94 g of HEMA, 0.375 g of 2,6-di-tert-butyl-4-methylphenol and 0.375 g of hydroquinone. Under a gentle air flow which is maintained over the entire reaction, the reaction mixture is heated. On attainment of a temperature of approx. 40° C., 0.77 g of trifluoromethanesulfonic acid is added. On attainment of a temperature of 80° C., the metered addition of 682.06 g of TMPO-EOX is commenced. The metered addition is performed within 5.5 h, in the course of which the temperature is kept at 80° C. After a post-reaction time of 1 h 45 min, the mixture is cooled. 250 g of PMA are added. The catalyst is neutralized by adding 3.5 g of Amberlyst A21 while stirring. After 45 min, the ion exchanger is removed by filtration. This gives a pale yellow, viscous liquid.

Analysis of the Product:
 NMR: no oxetane present
 Hydroxyl number: 185 mg KOH/g
 Iodine number: 12.3 g $I_2$/100 g Macromonomer 4
Preparation:
 A 250-ml 4-neck flask with stirrer, thermometer, reflux condenser and dropping funnel is initially charged at room temperature with 28.50 g of HEMA, 0.1 g of 2,6-di-tert-butyl-4-methylphenol and 0.1 g of hydroquinone. Under a gentle air flow which is maintained over the entire reaction, the reaction mixture is heated. On attainment of a temperature of approx. 40° C., 0.22 g of trifluoromethanesulfonic acid is added. On attainment of a temperature of 80° C., the metered addition of 171.50 g of TMPO-EOX is commenced. The metered addition is performed within 2 h, in the course of which the temperature is kept at 80° C. After a post-reaction time of 3 h 30 min, 50 g of methyl isobutyl ketone are added and the mixture is cooled to 60° C. The catalyst is neutralized by adding 1 g of Amberlyst A21 while stirring. After 1 h at 60° C. the ion exchanger is removed by filtration. This gives a pale yellow, viscous liquid.

Analysis of the Product:
 NMR: no oxetane present.
 Hydroxyl number: 209 mg KOH/g
 Iodine number: 21.4 g $I_2$/100 g Macromonomer 5
Preparation:
 1. Derivatization of TMPO-EOX With Glycidol to give TMPO-EOX-GI The reaction was conducted under a nitrogen atmosphere (drying with $P_2O_5$). 400 g of TMPO-EOX were initially charged in a 1000 ml 4-neck flask. A dropping funnel was used to add 17.59 g of potassium tert-butoxide and the mixture was stirred until a solution was obtained. The pale orange solution was heated to 80° C. With occasional application of reduced pressure, tert-butanol formed was distilled off over the course of 1 hour. The temperature of the reaction mixture was kept at 80° C. Then 340.22 g of the glycidol monomer were slowly added dropwise to the reaction mixture while stirring over the course of 4 hours (exothermic reaction), in the course of which the temperature of the reaction mixture was controlled such that it always remained below 90° C. After the addition had ended, the reaction mixture was stirred at 80° C. for a further hour.

Then a sample was taken and analyzed immediately by means of NMR spectroscopy, which showed that no glycidol monomers were present any longer and the oxetane ring was intact. Thereafter, the reaction was ended and the reaction mixture was cooled to room temperature. A viscous, yellowish liquid was obtained, which was diluted with 200 ml of methanol and neutralized with Amberlyst A21. The ion exchange resin was filtered off. The solvents were distilled off under reduced pressure (down to 2 mbar at 50° C.). The subsequent NMR analysis showed that the product contained 4 mol of hydroxyl groups per 1 mol of oxetane.

2. Reaction of HEMA with TMPO-EOX and TMPO-EOX-GI 25 g of HEMA were introduced at room temperature into a reaction vessel which was equipped with a mechanical stirrer, an addition funnel, a thermometer, a heating jacket and a condenser. The reaction was conducted under standard atmosphere (air).

150.73 g of TMPO-EOX and 92.98 g of TMPO-EOX-GI were introduced into the addition funnel.

134 mg of hydroquinone and 134 mg of 2,6-di-tert-butyl-4-methylphenol were added to the starter molecule (HEMA) in the reaction vessel. The mixture was stirred until a solution was obtained. To this was added 0.20 g of trifluoromethanesulfonic acid as a catalyst, and the temperature was increased to 75° C.

The mixture of the oxetane monomers was subsequently added dropwise continuously over the course of 6 hours, in the course of which the temperature was controlled such that it did not exceed 80° C. On completion of addition of the oxetane monomer, the reaction mixture was stirred at 80° C. for a further hour.

Then the reaction mixture was cooled to room temperature and the viscous product was dissolved in 269 g of isobutanol. The catalyst was neutralized with Amberlyst A-21 and the ion exchanger was filtered off.

Analysis of the Product:
NMR: no oxetane present
Hydroxyl number: 547 mg KOH/g
Iodine number: 10.0 g $I_2$/100 g III. Further Derivatization of Inventive Macromonomers Macromonomer 6
Preparation:

A 250 ml 4-neck flask with stirrer, thermometer, reflux condenser and dropping funnel is initially charged at room temperature with 100 g of macromonomer 2 and 0.2 g of a 10% solution of dibutyltin laurate (DBTL) in xylene. Under a gentle nitrogen stream which is maintained over the entire reaction, the reaction mixture is heated to 60° C. On attainment of the temperature, 100 g of stearyl isocyanate are metered in within 30 min such that the temperature does not rise above 65° C. as a result of the heat of reaction released. After the addition has ended, the mixture is kept at 60° C. for another 4 h. The reaction is ended.

An NCO determination shows full conversion based on stearyl isocyanate.

A pale yellow, viscous liquid is obtained, which partly solidifies under cold conditions.

Macromonomer 7
Preparation:

A 250 ml 4-neck flask with stirrer, thermometer, reflux condenser and dropping funnel is initially charged at room temperature with 100 g of macromonomer 4 and 0.3 g of a 10% solution of dibutyltin laurate (DBTL) in xylene. Under a gentle nitrogen stream which is maintained over the entire reaction, the reaction mixture is heated to 70° C. On attainment of the temperature, 200 g of MPEG350-TDI adduct (prepared from the reaction of MPEG350 with TDI, NCO content 7.97%, prepared analogously to patent DE10039837) are metered in within 45 min such that the temperature does not rise above 75° C. as a result of the heat of reaction released. After the addition has ended, the mixture is kept at 70° C. for another 3 h. The reaction is ended.

An NCO determination shows full conversion based on MPEG350-TDI adduct. This gives a yellow, viscous liquid.

Example 2

Synthesis of the Polymers

Polymer 1
Preparation:

Solvents and monomers were freed of air by blowing in nitrogen. The reaction was conducted under a nitrogen atmosphere.

The polymerization was conducted in a 500 ml four-neck flask which was equipped with a cooling unit, a heating jacket, thermometer, mechanical stirrer and a device for blowing in nitrogen.

The solvent PMA (142.61 g), the monomers IBMA (14.56 g), STY (9.80 g), macromonomer 3 (21.14 g) and Silaplane FM0721 (10.63 g), and the free-radical initiator Trigonox C (0.61 g), were introduced into the reaction vessel, mixed, freed of air with nitrogen and heated to 130° C. for 3 hours.

Subsequently, a further 0.1 g of the free-radical initiator Trigonox C was added. After a further 30 minutes, a further 0.1 g of the free-radical initiator was added again. The reaction was continued for a further 30 minutes and then the reaction mixture was cooled to room temperature. The solvent was distilled off under reduced pressure.

Analysis of the Product (SEC):
Mw=14 899
Polydispersity 4.47

Polymer 2
Preparation:

Solvents and monomers were freed of air by blowing in nitrogen. The reaction was conducted under a nitrogen atmosphere.

The polymerization was conducted in a 500 ml four-neck flask which was equipped with a cooling unit, a heating jacket, thermometer, mechanical stirrer and a device for blowing in nitrogen.

The solvent PMA (142.61 g), and the monomer Silaplane FM0721 (10.50 g) were introduced into the reaction vessel, mixed, freed of air with nitrogen and heated to 130° C.

The further monomers (IBMA (14.10 g), STY (9.68 g), macromonomer 3 (20.89 g), Fluowet MA600 (0.89 g)) and the free-radical initiator (Trigonox C (0.60 g)) and the chain transfer reagent (alpha-methylstyrene dimer (0.73 g)) were mixed, freed of air with nitrogen and introduced into an addition funnel. The monomers, the free-radical initiator and the chain transfer reagent were then introduced gradually into the reaction vessel over the course of 3 hours.

Thereafter, another 0.1 g of the free-radical initiator (Trigonox C) was added. After a further 30 minutes, 0.1 g of the free-radical initiator (Trigonox C) was added once again. This was repeated once again after a further 30 minutes, the reaction was again continued for another 30 minutes and the reaction mixture was then cooled to room temperature. The solvent was distilled off under reduced pressure.

Analysis of the Product (SEC):
Mw=10 560
Polydispersity 3.64

Polymer 3
Preparation:

Solvents and monomers were freed of air by blowing in nitrogen. The reaction was conducted under a nitrogen atmosphere.

The polymerization was conducted in a 500 ml four-neck flask which was equipped with a cooling unit, a heating jacket, thermometer, mechanical stirrer and a device for blowing in nitrogen.

The solvent PMA (71.33 g), and the monomer Silaplane FM0721 (26.38 g) were introduced into the reaction vessel, mixed, freed of air with nitrogen and heated to 110° C.

The further monomers (EHA (5.74 g), macromonomer 2 (15.88 g), and the free-radical initiator (Perkadox AMBN (0.30 g)) and the chain transfer reagent (alpha-methylstyrene dimer (0.37 g)) were mixed, freed of air with nitrogen and introduced into an addition funnel. The monomers, the free-radical initiator and the chain transfer reagent were then introduced gradually into the reaction vessel over the course of 3 hours.

After the addition had ended, the reaction was continued for a further 4.5 hours. Thereafter, another 0.07 g of the free-radical initiator was added. After a further 30 minutes, 0.07 g of the free-radical initiator was added once again. This was repeated once more after a further 30 minutes, then the reaction was continued for another 2 hours and the reaction mixture was then cooled to room temperature. The solvent was distilled off under reduced pressure.
Analysis of the Product (SEC):
   Mw=17 410
   Polydispersity 4.81
Polymer 4
Preparation:
   Solvents and monomers were freed of air by blowing in nitrogen. The reaction was conducted under a nitrogen atmosphere.
   The polymerization was conducted in a 500 ml four-neck flask which was equipped with a cooling unit, a heating jacket, thermometer, mechanical stirrer and a device for blowing in nitrogen.
   The solvent PMA (50.18 g) was introduced into the reaction vessel, mixed, freed of air with nitrogen and heated to 110° C.
   The monomers (EHA (33.33 g), AA (0.77 g), macromonomer 3 (43.9 g in PMA) and the free-radical initiator (Perkadox AMBN (0.82 g)) and the chain transfer reagent (alpha-methylstyrene dimer (1.01 g)) were mixed, freed of air with nitrogen and introduced into an addition funnel. The monomers, the free-radical initiator and the chain transfer reagent were then introduced gradually into the reaction vessel over the course of 3 hours.
   After the addition had ended, the reaction was continued for a further 4 hours. Thereafter, another 0.15 g of the free-radical initiator was added. After a further minutes, 0.15 g of the free-radical initiator was added once again. This was repeated once again after a further 30 minutes, then the reaction was continued for another 2 hours and the reaction mixture was then cooled to room temperature. The solvent was distilled off under reduced pressure.
Analysis of the Product (SEC):
   Mw=10 508
   Polydispersity 4.31
Polymer 5
Preparation:
   Solvents and monomers were freed of air by blowing in nitrogen. The reaction was conducted under a nitrogen atmosphere.
   The polymerization was conducted in a 500 ml four-neck flask which was equipped with a cooling unit, a heating jacket, thermometer, mechanical stirrer and a device for blowing in nitrogen.
   The solvent isobutanol (85.24 g) was introduced into the reaction vessel, mixed, freed of air with nitrogen and heated to 110° C.
   The monomers (EHA (38.97 g), AA (1.86 g), BISOMER MPEG550MA (64.92 g), macromonomer 3 (104.57 g) and the free-radical initiator (Perkadox AMBN (2 g)) and the chain transfer reagent (alpha-methylstyrene dimer (2.44 g)) were mixed, freed of air with nitrogen and introduced into an addition funnel. The monomers, the free-radical initiator and the chain transfer reagent were then introduced gradually into the reaction vessel over the course of 4 hours.
   After the addition had ended, the reaction was continued for a further 3 hours. Thereafter, another 0.15 g of the free-radical initiator was added. After a further minutes, 0.15 g of the free-radical initiator was added once again. This was repeated once again after a further 30 minutes, then the reaction was continued for another 2 hours and the reaction mixture was then cooled to room temperature. The solvent was distilled off under reduced pressure.

Analysis of the Product (SEC):
   Mw=10 877
   Polydispersity 2.81
Polymer 6
   A 250 ml 4-neck flask with stirrer, thermometer, reflux condenser and dropping funnel is initially charged at room temperature with 47.94 g of Dowanol PMA and 2.57 g of Silaplane FM-0721. Over the course of the entire reaction, nitrogen is passed over. The reaction mixture is heated to 135° C. After the temperature has been attained, the mixture of 43.96 g of n-butyl acrylate, 4.88 g of macromonomer 4 and 0.5 g of Trigonox C are metered in within 3 h. After the end of metered addition, and 30 min and 60 min later, 0.25 g each time of Trigonox C is added once again. After a further 60 min, the reaction is ended.
Analysis of the Product (SEC):
   Mw=15 128
   Polydispersity 3.14
Polymer 7
   A 250 ml 4-neck flask with stirrer, thermometer, reflux condenser and dropping funnel is initially charged at room temperature with 47.94 g of Dowanol PMA and 2.57 g of Silaplane FM-0721. Over the course of the entire reaction, nitrogen is passed over. The reaction mixture is heated to 135° C. After the temperature has been attained, the mixture of 39.07 g of n-butyl acrylate, 9.77 g of macromonomer 4 and 0.5 g of Trigonox C is metered in within 3 h. After the end of metered addition, and 30 min and 60 min later, 0.25 g each time of Trigonox C is added once again. After a further 60 min, the reaction is ended.
Analysis of the Product (SEC):
   Mw=22 660
   Polydispersity 4.73
Polymer 8
   A 250 ml 4-neck flask with stirrer, thermometer, reflux condenser and dropping funnel is initially charged at room temperature with 73.50 g of Dowanol PMA and 4.45 g of Silaplane FM-0721. Over the course of the entire reaction, nitrogen is passed over. The reaction mixture is heated to 135° C. After the temperature has been attained, the mixture of 19.91 g of i-butyl methacrylate, 13.05 g of styrene, 10.42 g of HEMA, 1.16 g of macromonomer 4 and 0.67 g of Trigonox C are metered in within 3 h. After the end of metered addition, and 30 min and 60 min later, 0.112 g each time of Trigonox C is added once again. After a further 60 min, the reaction is ended.
Analysis of the Product (SEC):
   Mw=19 965
   Polydispersity 3.99
Polymer 9
   A 500 ml 4-neck flask with stirrer, thermometer, reflux condenser and dropping funnel is initially charged at room temperature with 192 g of Dowanol PMA. Over the course of the entire reaction, nitrogen is passed over. The reaction mixture is heated to 135° C. After the temperature has been attained, the mixture of 176.80 g of n-butyl acrylate, 31.20 g of macromonomer 4 and 1.03 g of Trigonox C are metered in within 2.5 h. After the end of metered addition, and 30 min and 60 min later, 0.52 g each time of Trigonox C is added once again. After a further 60 min, the reaction is ended.
Analysis of the Product (SEC):
   Mw=14 551
   Polydispersity 2.96
Polymer 10
   A 500 ml 4-neck flask with stirrer, thermometer, reflux condenser and dropping funnel is initially charged at room temperature with 144 g of Dowanol PMA. Over the course of the entire reaction, nitrogen is passed over. The reaction mixture is heated to 135° C. After the temperature has been attained, the mixture of 107.48 g of ethylhexyl acrylate, 25.12 g of ethyl acrylate, 32.96 g of macromonomer 4 and 0.773 g of Trigonox C are metered in within 3 h. After the end of metered addition, and 30 min and 60 min later, 0.38 g each time of Trigonox C is added once again. After a further 60 min, the reaction is ended.

Analysis of the Product (SEC):
Mw=8798
Polydispersity 2.26

Polymer 11

PMA (47.4 g), macromonomer 3 (50 g) and alpha-methylstyrene dimer (1.1 g) are heated to 120° C. under nitrogen in a reaction vessel.

Then a mixture of DMAEMA (15.2 g) and Perkadox AMBN (1.1 g) is metered in at 0.5 ml/min. Thereafter, Perkadox AMBN (0.5 g) is added to the reaction. The post-reaction time is 2 hours. The polymer solution is adjusted to a solids content of 40% with PMA.

Mn=6751 g/mol
Mw/Mn=5.42

Comparative Example

Comparative Polymer C1

(Random Copolymer Prepared with Linear MPEG Monomethacrylate (Blemmer PME 1000)

PMA (56.5 g), Blemmer PME 1000 (38 g) and alpha-methylstyrene dimer (1.1 g) are heated to 120° C. under nitrogen in a reaction vessel.

Then a mixture of DMAEMA (16.3 g) and Perkadox AMBN (1.1 g) is metered in at 0.5 ml/min. Thereafter, Perkadox AMBN (0.5 g) is added to the reaction. The post-reaction time is 2 hours. The polymer solution has a solids content of 50%.

Mn=10 125 g/mol
Mw/Mn=5.67

Polymer 12 (Dispersant 3)

PMA (47.4 g), macromonomer 3 (50 g) and alpha-methylstyrene dimer (1.1 g) are heated to 120° C. under a nitrogen atmosphere in a reaction vessel.

Then a mixture of DMAEMA (15.2 g) and Perkadox AMBN (1.1 g) is metered in at 0.5 ml/min. Thereafter, Perkadox AMBN (0.5 g) is added to the reaction.

12 g of benzyl chloride and 30 g of butylglycol are added and the mixture is reacted at 120° C. for 2 hours. The polymer solution is adjusted to a solids content of 40% with PMA.

Polymer 13 (Dispersant 4)

PMA (47.4 g), macromonomer 3 (50 g) and alpha-methylstyrene dimer (1.1 g) are heated to 120° C. under a nitrogen atmosphere in a reaction vessel.

Then a mixture of DMAEMA (15.2 g) and Perkadox AMBN (1.1 g) is metered in at 0.5 ml/min. Thereafter, Perkadox AMBN (0.5 g) is added to the reaction.

25 g of Disperbyk 102 are added and the mixture is homogenized at 50° C. for 30 min. The polymer solution is adjusted to a solids content of 40% with PMA.

Polymer 14 (Dispersant 5)

PMA (47.4 g), macromonomer 3 (50 g) and alpha-methylstyrene dimer (1.1 g) are heated to 120° C. under a nitrogen atmosphere in a reaction vessel.

Then a mixture of vinylimidazole (15.2 g) and Perkadox AMBN (1.1 g) is metered in at 0.5 ml/min. Thereafter, Perkadox AMBN (0.5 g) is added to the reaction.

The post-reaction time is 2 hours. The polymer solution is adjusted to a solids content of 40% with PMA.

Use Examples a) Flow Control Agent

Test system: acrylate-melamine baking varnish, clear
Composition (figures in parts by weight)
Setalux 1760 VB 64 44.0
Setalux C 91389 VX 45 16.5
Luwipal 018 25.3
butyldiglycol acetate 2.1
Solvesso 150 4.8
butanol 6.1
butyldiglycol 1.2
are mixed, then the following are added:
butanol 8.0
Solvesso 150 3.8
butyldiglycol 1.8
Setalux 1760 VB 64=acrylate baking resin, Nuplex Resins, Bergen op Zoom
Setalux C 91389 VX 45=acrylate baking resin, Nuplex Resins, Bergen op Zoom
Luwipal 018=melamine baking resin, BASF AG, Ludwigshafen The flow control agents (polymer 6, polymer 7, polymer 9, polymer 10, Modaflow or no flow control agent, according to table below) were incorporated one day before application. The dosage was 0.15% by weight, based on the overall mixture. The day of the application, the viscosity was adjusted with Solvesso 150 to 24 seconds, DIN 4 mm flow cup (23° C.). The application was effected by means of an automatic sprayer.

After a venting time of 30 minutes, curing was effected at 140° C. within 30 minutes. The layer thickness was 20 µm.

The leveling was assessed with the wave-scan DOI from Byk-Gardner, by measuring the long wave, the short wave and the DOI (distinctness of image) value. Gloss and haze were assessed with the Haze-Gloss from Gardner.

|  | Long wave | Short wave | DOI | R20 Gloss | Haze |
|---|---|---|---|---|---|
| No add. | 58 | 64 | 73 | 89 | 76 |
| Modaflow* | 18 | 23 | 90 | 94 | 18 |
| Polymer 6 | 2 | 14 | 92 | 97 | 13 |
| Polymer 7 | 17 | 20 | 92 | 97 | 14 |
| Polymer 9 | 12 | 16 | 92 | 97 | 14 |
| Polymer 10 | 11 | 14 | 92 | 97 | 13 |

*MODAFLOW is a flow control agent from Cytec Industries

The results show that, when the polymers are used as a flow control agent, better results are achieved with regard to leveling, gloss and haze than in the case of use of a conventional flow control agent or without a flow control agent.

b) Dirt-Repellent Surfaces

Test system: acrylate/melamine baking varnish:

| Setalux C1502 | 54.00% |
|---|---|
| Maprenal MF600 | 28.00% |
| Shellsol A | 4.00% |
| Solvesso 150 | 4.00% |
| xylene | 10.00% |
| Total | 100.00% |

Setalux C1502 = acrylate baking resin, Nuplex Resins, Bergen op Zoom, the Netherlands
Maprenal MF600 = melamine baking resin, Ineos Melamines, Frankfurt, Germany The percentages are percentages by weight, based on the overall mixture.

Production of the Acrylate-Melamine Baking Varnish:

All components are mixed and homogenized with a dissolver at a peripheral speed of 5 m/s for 10 minutes. Thereafter, the viscosity is adjusted with xylene to 24 seconds, DIN 4 mm cup (23° C.).

The additives to be tested are incorporated into the varnish with a Scandex agitator in a concentration of 1% by weight of active substance, based on the overall mixture, for 10 minutes.

After the incorporation, the additivized varnishes are applied to a primed aluminum sheet in a 100 μm wet film with a coating knife. After a venting time of 10 minutes, the sheets are baked at 140° C. for 20 minutes. Two sheets are produced for each additivized varnish.

The varnish films obtained are assessed for their dirt, water- and oil-repellent effect according to the following criteria:

Visual Assessment of the Varnish Surface:

The varnish surface is examined for opacity in the film and surface defects, such as craters, specks and incompatibilities.

Rating: 1-5
1=varnish surface with no surface defects
5=varnish surface with many surface defects Edding Test:

An edding 400 permanent marker is used to inscribe the varnish surface, and a visual assessment is made as to whether the surface can be written on. There is an assessment of whether the ink on the surface spreads or draws together. After the ink has dried, an attempt is made to wipe it off with a dry cloth.

Rating: 1-5
1=ink draws together, can be removed with a paper towel without residue
5=ink spreads very well on substrate, is virtually impossible to remove Bitumen Test:

Bitumen is heated until it has liquefied to such an extent that it can be applied to the varnish surface. After the bitumen mass has cooled, a visual assessment is made as to how well it can be detached again manually from the surface without residue.

Rating: 1-5:
1=bitumen can be removed easily and without residue
5=bitumen adheres firmly on the surface and is virtually impossible to remove Staining with Bayferrox Powder:

3 spoonfuls of Bayferrox 130M, iron oxide pigment, Bayer AG, are scattered onto the varnish surface and rinsed off again with distilled water in 5 squirts using a wash bottle. The substantially residue-free surface is assessed visually.

Rating: 1-5:
1=Bayferrox powder can be washed off with water with no residue
5=no cleaning effect on rinsing with water; a large red spot remains Water Runoff Test:

One drop of water is applied to the surface. The coated varnish surface is then tilted until the drop runs off. There is a visual assessment as to the angle with which the drop runs off and whether the drop runs off without residue.

Rating: 1-5:
1=small angle is sufficient and the drop runs off completely without forming traces and residual droplets.

5=varnished sheet has to be tilted significantly before the drop runs off; water residues possibly remain on the varnish surface Mineral Oil Runoff Test:

One drop of commercial mineral oil is applied to the varnish surface. Subsequently, the coated varnish surface is tilted until the drop has run about 10 cm. After 5 minutes have elapsed, the oil trace or renewed drop formation is assessed visually.

Rating: 1-5:
1=the oil trace immediately reforms into individual drops
5=the oil trace does not reform, but possibly spreads further The results obtained are shown in the following table:

| | Surface | Edding | Bitumen | Bayferrox | Water run | Mineral oil |
|---|---|---|---|---|---|---|
| Control without additive | 2 | 5 | 5 | 5 | 5 | 5 |
| Polymer 3 | 1 | 1 | 1 | 1 | 1 | 1 |
| Polymer 8 | 1 | 1 | 1 | 1 | 1 | 1 |

The results show that the use of the polymers as additives achieves a very good dirt-, oil- and water-repellent surface.

c) Wetting Agent and Dispersant

Use of the polymers as a wetting agent and dispersant for production of pigment concentrates and use thereof in paint systems Starting Materials Uralac SN 831 polyester resin, manufacturer: DSM Resins
Cymel 303 melamine-formaldehyde resin, manufacturer: Cytec Industries
Dynapol Catalyst 1203 catalyst, manufacturer: Evonik Degussa
Ti Pure R960 titanium dioxide pigment, manufacturer: Du Pont
Bayferrox 140M iron oxide red pigment, manufacturer: Lanxess
Aerosil R972 hydrophobic, fumed silica, manufacturer: Degussa
BYK 057 silicone-free polymer defoamer, manufacturer: Byk Chemie
BYK 355 acrylate leveling additive, manufacturer: Byk Chemie
Solvesso 150 ND aromatic solvent, manufacturer: ExxonMobil
Dowanol PMA 1-methoxy-2-propyl acetate, manufacturer: Dow Chemical Procedures Production of the Ti Pure R960 Pigment Concentrates
Milling Conditions:
Apparatus: Lau Paint Shaker DAS H [/A]200-K
Milling time: 60 min, normal speed, maximum cooling
Millbase additive: 50% by weight of glass beads (diameter 1 mm)

Composition of the Ti Pure 960 Pigment Concentrates:

| Millbase: | Inventive: Pigment concentrate Ti pure 1 | Comparative example: Pigment concentrate Ti pure 2 |
|---|---|---|
| Uralac SN831 | 26.2 | 26.2 |
| Additive: polymer 11 | 2.1 | — |

-continued

| Millbase: | Inventive:<br>Pigment concentrate<br>Ti pure 1 | Comparative example:<br>Pigment concentrate<br>Ti pure 2 |
|---|---|---|
| Additive:<br>comparative<br>polymer C1 | — | 2.1 |
| Dowanol PMA | 5.0 | 5.0 |
| Solvesso<br>150ND | 10.8 | 11.2 |
| Aerosil R972 | 0.6 | 0.6 |
| BYK-057 | 0.3 | 0.3 |
| Ti pure R960 | 55.0 | 55.0 |
| | 100.0 | 100.0 |

Production of the Bayferrox 140M Pigment Concentrates:
Milling Conditions:
Apparatus: Lau Paint Shaker DAS H [/A]200-K
Milling time: 120 min, normal speed, maximum cooling
Millbase additive: 50% by weight of glass beads (diameter 1 mm)
Composition of the Bayferrox 140M Pigment Concentrates:

| Millbase: | Inventive:<br>Pigment concentrate<br>Bayferrox 1 | Comparative example:<br>Pigment concentrate<br>Bayferrox 2 |
|---|---|---|
| Uralac SN831 | 33.7 | 33.7 |
| Additive: polymer 11 | 8.4 | — |
| Additive: comparative<br>polymer C1 | — | 8.4 |
| Dowanol PMA | 5.0 | 5.0 |
| Solvesso 150ND | 7.1 | 8.7 |
| Aerosil R972 | 0.5 | 0.5 |
| BYK-057 | 0.3 | 0.3 |
| Bayferrox 140M | 45.0 | 45.0 |
| | 100.0 | 100.0 |

Production of the Test Formulations
Composition of the Clearcoat

| | Clearcoat |
|---|---|
| Uralac SN 831 | 64.0 |
| Cymel 303 | 13.8 |
| Dynapol Catalyst 1203 | 4.9 |
| BYK-057 | 0.4 |
| BYK-355 | 1.1 |
| Solvesso 150 ND | 10.5 |
| Dowanol PMA | 5.3 |
| | 100.0 |

Composition of the Test Formulations

| | White:red<br>70:30 |
|---|---|
| Clearcoat | 21.9 |
| Ti Pure R960 pigment concentrate | 19.1 |
| Bayferrox 140M pigment<br>concentrate | 9.0 |
| | 50.0 |

A test formulation which comprised the pigment concentrates produced with polymer 11 was produced (Ti Pure 1 pigment concentrate and Bayferrox 1 pigment concentrate), as well as a comparative test formulation which comprised the pigment concentrates produced with the polymer of comparative example C1 (Ti Pure 2 pigment concentrate and Bayferrox 2 pigment concentrate).

After the production, the viscosity of the test formulations was adjusted with Solvesso 150ND to 90-110 sec (DIN 4 flow cup, 23° C.). The amount of Solvesso 150ND required for this purpose in each case can be found in the following table:

| Test formulation<br>comprising . . . | Starting<br>viscosity [s] | Amount<br>of Solvesso<br>150ND required | Final<br>viscosity<br>[s] |
|---|---|---|---|
| Ti pure 1 and Bayferrox 1<br>pigment concentrates<br>(inventive) | 99 | — | 99 |
| Ti pure 2 and Bayferrox 2<br>pigment concentrates<br>(comparative example) | 120 | 1% | 105 |

Result:

The use of polymer 11 (prepared with inventive branched oxetane-based macromonomers) as a wetting agent and dispersant gave a coating composition with lower viscosity than the comparative formulation comprising the noninventive comparative polymer C1 (prepared with noninventive linear polyether monomers).

Application of the Test Formulation

The day of production, the test formulations were applied to substrates under the following conditions:
Substrates: Alcan aluminum sheets, precoated with a PU primer layer of thickness of about 5 μm
Knife-coating application: 80 μm (wet)
Oven temperature: 320° C.
Baking time: 30 s
Max. metal temperature: 235° C.
Dry film layer thickness: 18-20 μm The separation, floating and flocculation properties were evaluated as follows.

Rub-Out Test

Immediately after the application, the freshly applied paint layers on the two halves of the substrate surface were subjected to a rub-out test.

For this purpose, some parts of the fresh paint layers were rubbed mechanically after the application and then the change in hue caused by the rubbing (rub-out effect) was measured with respect to the unrubbed paint. The causes of the rub-out effect are, for example, flocculation and/or floating of pigments. If pigment flocculates are present, they are destroyed by the shearing effect in the course of rubbing, and the original target hue is the result. The rub-out effect can be minimized by suitable dispersants, and is thus a measure of the efficacy of a dispersant.

Colorimetric Analyses (ΔE, Lab)

Apparatus: Color guide, BYK-Gardner
Illuminant: D65 standard light (daylight)
Analysis field: 10°
Analysis geometry: d/8° spin (diffuse illumination, angle of observation 8°)
Number of measurements: n=3

The colorimetry results are reproduced in the table below.

The ΔE determined for a formulation indicates the color difference between the rubbed and unrubbed sites of the coating (rub-out effect).

The Lab values correspond to the color parameters L (brightness), a (red-green) and b (blue-yellow) of the CIELAB color space.

| Test formulation comprising . . . | ΔE unstirred | Lab unstirred | Gloss 60° |
|---|---|---|---|
| Pigment concentrates Ti pure 1 and Bayferrox 1 (inventive) | 0.13 | 50.73 21.02 6.95 | 93 |
| Pigment concentrates Ti pure 2 and Bayferrox 2 (comparative example) | 0.47 | 50.77 20.39 6.25 | 92 |

The use of the polymers obtained with inventive oxetane-based macromonomers as a wetting agent and dispersant gives formulations which, even without prior stirring, have a lower rub-out effect (ΔE) than those formulations which comprise conventional dispersants produced with linear polyether-based monomers.

The invention claimed is:

1. A process for preparing a macromonomer, wherein at least one hydroxyoxetane of the formula (I)

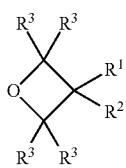

in which
R$^1$ is alkyl, alkoxy, alkoxyalkyl, aryloxyalkyl, hydroxyalkyl, hydroxyalkoxy, hydroxyalkoxyalkyl, aryl, aryloxy, hydroxyaryl or hydroxyaryloxy,
R$^2$ is hydroxyalkyl, hydroxyalkoxy, hydroxyalkoxyalkyl, hydroxyaryl or hydroxyaryloxy, and
R$^3$ is in each case independently hydrogen, alkyl, alkoxy, alkoxyalkyl, aryloxyalkyl, hydroxyalkyl, hydroxyalkoxy, hydroxyalkoxyalkyl, aryl, aryloxy, hydroxyaryl or hydroxyaryloxy,
is reacted with a starter molecule U-L-X—H in which
U=an ethylenically unsaturated, free-radically polymerizable head group other than allyl [H$_2$C=CH—CH$_2$—],
L=divalent organic radical without free-radically polymerizable groups, and
X—H=group which cannot be polymerized free-radically and has an active hydrogen atom H, in a molar ratio (hydroxyoxetane(s) of the formula (I): starter molecule) of (100:1) to (1:1) in the presence of at least one suitable catalyst in a cationic ring-opening polymerization.

2. The process as claimed in claim 1, wherein the reaction is effected in the presence of at least one inhibitor of free-radical polymerization.

3. The process as claimed in claim 1, wherein the molar ratio (hydroxyoxetane(s) of the formula (I): starter molecule) is from (50:1) to (2:1).

4. The process as claimed in claim 1, wherein the at least one hydroxyoxetane of the formula (I) is
a 3-alkyl-3-(hydroxyalkyl)oxetane [i.e. R$^1$=alkyl, R$^2$=hydroxyalkyl, all R$^3$=H],
a 3,3-di(hydroxyalkyl)oxetane [i.e. R$^1$, R$^2$=hydroxyalkyl, all R$^3$=H],
a 3-alkyl-3-(hydroxyalkoxy)oxetane [i.e. R$^1$=alkyl, R$^2$=hydroxyalkoxy, all R$^3$=H],
a 3-alkyl-3-(hydroxyalkoxyalkyl)oxetane [i.e. R$^1$=alkyl, R$^2$=hydroxyalkoxyalkyl, all R$^3$=H],
or a mixture of these hydroxyoxetanes.

5. The process as claimed in claim 1, wherein the at least one hydroxyoxetane is
3-methyl-3-(hydroxymethyl)oxetane [i.e. R$^1$=methyl, R$^2$=hydroxymethyl, all R$^3$=H],
3-ethyl-3-(hydroxymethyl)oxetane [i.e. R$^1$=ethyl, R$^2$=hydroxymethyl, all R$^3$=H] (=trimethylolpropane oxetane),
derivatives of trimethylolpropane oxetane which have been ethoxylated and/or propoxylated on the hydroxyl group and have 1-20 ethylene oxide and/or propylene oxide units which may be arranged randomly, in blocks or in the manner of a gradient,
3,3-di(hydroxymethyl)oxetane [i.e. R$^1$=R$^2$=hydroxymethyl, all R$^3$=H], or a mixture of these hydroxyoxetanes.

6. The process as claimed in claim 1, wherein the ethylenically unsaturated head group is U=acryloyl [H$_2$C=CH—C(=O)—] or methacryloyl [H$_2$C=C(CH$_3$)—C(=O)—].

7. The process as claimed in claim 1, wherein the divalent organic L radical has the structure —O-L' where —O— is an oxygen atom and L' is selected from the group consisting of alkylene radicals and polyalkylene oxide radicals.

8. The process as claimed in claim 1, wherein the X—H group is a hydroxyl group O—H or a thiol group S—H.

9. The process as claimed in claim 1, wherein the starter molecule U-L-X—H is selected from the group consisting of hydroxyalkyl esters of methacrylic acid [H$_2$C=C(CH$_3$)—C(=O)—O—(CH$_2$)$_a$—OH] and polyethylene oxide esters of methacrylic acid [H$_2$C=C(CH$_3$)—C(=O)—O—(CH$_2$—CH$_2$—O)$_a$—H] where a=1-20.

10. The process as claimed in claim 1, wherein the starter molecule U-L-X—H is hydroxyethyl methacrylate or hydroxybutyl methacrylate.

11. The process of claim 4, wherein the at least one hydroxyoxetane of the formula (I) is a 3-alkyl-3-(hydroxyalkyl)oxetane [i.e. R$^1$=alkyl, R$^2$=hydroxyalkyl, all R$^3$=H] and/or a 3-alkyl-3-(hydroxyalkoxy)oxetane [i.e. R$^1$=alkyl, R$^2$=hydroxyalkoxy, all R$^3$=H] or a mixture thereof.

12. The process of claim 5, wherein the at least one hydroxyoxetane is 3-ethyl-3-(hydroxymethyl)oxetane (=trimethylolpropane oxetane) and/or at least one derivative of trimethylolpropane oxetane which has been ethoxylated and/or propoxylated on the hydroxyl group and has 1-20 ethylene oxide and/or propylene oxide units which may be arranged randomly, in blocks or in the manner of a gradient.

* * * * *